(12) United States Patent
Qian et al.

(10) Patent No.: US 10,892,705 B2
(45) Date of Patent: Jan. 12, 2021

(54) SWEEPING DEVICE FOR THE PHOTOVOLTAIC PANEL

(71) Applicant: Hangzhou Sun Ocean Photovoltaic Science & Technology Co., Ltd., Zhejiang (CN)

(72) Inventors: Xiangzhong Qian, Zhejiang (CN); Tao Jiang, Zhejiang (CN); Hong Song, Zhejiang (CN); Yifan Su, Zhejiang (CN); Meicheng Sang, Zhejiang (CN); Liuyi Zhou, Zhejiang (CN)

(73) Assignee: HANGZHOU SUN OCEAN PHOTOVOLTAIC SCIENCE & TECHNOLOGY CO., LTD., Zhejiang (CN)

( * ) Notice: Subject to any disclaimer, the term of this patent is extended or adjusted under 35 U.S.C. 154(b) by 38 days.

(21) Appl. No.: 16/081,366

(22) PCT Filed: May 13, 2016

(86) PCT No.: PCT/CN2016/082133
§ 371 (c)(1),
(2) Date: Aug. 30, 2018

(87) PCT Pub. No.: WO2017/148005
PCT Pub. Date: Sep. 8, 2017

(65) Prior Publication Data
US 2019/0089295 A1    Mar. 21, 2019

(30) Foreign Application Priority Data

Mar. 2, 2016  (CN) .................... 2016 2 0160552 U
Mar. 2, 2016  (CN) .................... 2016 2 0160553 U (Continued)

(51) Int. Cl.
| H02S 40/10 | (2014.01) |
| F24S 40/20 | (2018.01) |
| B08B 1/00  | (2006.01) |

(52) U.S. Cl.
CPC .............. *H02S 40/10* (2014.12); *B08B 1/005* (2013.01); *B08B 1/008* (2013.01); *F24S 40/20* (2018.05)

(58) Field of Classification Search
CPC .......... B08B 1/005; B08B 1/008; F24S 40/20; H02S 40/10
See application file for complete search history.

(56) References Cited

U.S. PATENT DOCUMENTS

| 9,455,665 B1 * | 9/2016 | Meller | ................... H02S 40/10 |
| 2013/0206167 A1 * | 8/2013 | Mor | ........................ B08B 1/008 134/6 |

(Continued)

FOREIGN PATENT DOCUMENTS

| CN | 103904989 A | * | 7/2014 | ............. F24S 40/20 |
| CN | 204578452 U | * | 8/2015 | |

(Continued)

OTHER PUBLICATIONS

CN 204721297 U—English Machine Translation (Year: 2015).*
Translation of International Search Report, PCT/CN2016/082133, Hangzhou Sun Ocean Photovoltaic Science & Technology Co., Ltd., 2 pages (dated Sep. 19, 2016).

*Primary Examiner* — Marc Carlson
(74) *Attorney, Agent, or Firm* — Foley & Lardner LLP

(57) ABSTRACT

Provided is a sweeping device for a photovoltaic panel, applied to a photovoltaic unit composed of a plurality of photovoltaic panel arrays arranged in sequence, the sweeping device comprises a guide rail mechanism composed by an upper rail and a lower rail respectively disposed on an upper side and a lower side of respective photovoltaic panel arrays and a plurality of scraper mechanisms for sweeping (Continued)

the plurality of photovoltaic panel arrays, and each photovoltaic panel array corresponds to one scraper mechanism at most, the respective scraper mechanisms are slidably disposed on the guide rail mechanism to which an arbitrary photovoltaic panel array corresponds; the sweeping device further comprises a pull rope mechanism for driving the respective scraper mechanisms to reciprocate on the photovoltaic unit, and a driving mechanism connected with the pull rope mechanism.

19 Claims, 13 Drawing Sheets

(30) Foreign Application Priority Data

Mar. 2, 2016 (CN) ...................... 2016 2 0160555 U
Mar. 2, 2016 (CN) ...................... 2016 2 0160991 U

(56) References Cited

U.S. PATENT DOCUMENTS

| 2015/0349706 | A1* | 12/2015 | Grossman | H02S 40/10 |
| | | | | 134/6 |
| 2016/0380582 | A1* | 12/2016 | Park | H02S 40/10 |
| | | | | 136/244 |
| 2017/0194898 | A1* | 7/2017 | Meller | H02S 40/10 |

FOREIGN PATENT DOCUMENTS

| CN | 204721297 U | * | 10/2015 | .............. F24S 40/20 |
| CN | 204886836 U | * | 12/2015 | |
| CN | 106475332 A | * | 3/2017 | |
| WO | WO 2016/001944 A1 | | 1/2016 | |
| WO | WO-2016001944 A1 | * | 1/2016 | ............... B08B 3/02 |
| WO | WO-2016017852 A1 | * | 2/2016 | ............. F24S 40/20 |

* cited by examiner

SWEEPING DEVICE FOR THE PHOTOVOLTAIC PANEL

CROSS REFERENCE TO RELATED APPLICATIONS

This application is a U.S. National Stage Application of International Application No. PCT/CN2016/082133, filed May 13, 2016, which claims the priority of the Chinese patent application No. 201620160555.7 filed on Mar. 2, 2016, the Chinese patent application No. 201620160991.4 filed on Mar. 2, 2016, the Chinese patent application No. 201620160553.8 filed on Mar. 2, 2016, and the Chinese patent application No. 201620160552.3 filed on Mar. 2, 2016, all of which are incorporated herein by reference in their entireties.

TECHNICAL FIELD

This application relates to a sweeping device, and more particularly to a sweeping device for a photovoltaic panel applied to a photovoltaic panel array.

BACKGROUND

Photovoltaic power generation is a type of clean energy with a broad prospect, installed capacity of solar power generation in China will reach 100 million kilowatts by 2020. However, due to the poor air quality in China, dust in the air seriously affects power generation efficiency of photovoltaic modules. According to statistics, power generation efficiency will be affected more than 20% if photovoltaic panel modules are not cleaned in one year. All large-scale power stations that have been installed in China are mainly based on manual sweeping, efficiency is very low. Snow can only rely on natural melting, power generation efficiency is affected.

In order to improve efficiency of sweeping the photovoltaic panel, it needs to provide a sweeping device for sweeping the photovoltaic panel, the existing conventional sweeping device mainly is a sweeping robot, the sweeping robot can complete automatic sweeping of the photovoltaic panel, but its structure is very complicated and it is expensive, some domestic small-scale power stations cannot afford.

Therefore, how to reduce cost of the whole sweeping device and simplify structure of the whole sweeping device while effectively sweeping the photovoltaic panel array is a problem that needs to be solved currently.

SUMMARY

The object of some embodiments of the present invention is to provide a sweeping device for a photovoltaic panel, the sweeping device not only has a simple structure and a low cost, but also can simultaneously clean the photovoltaic panel array and improve the sweeping efficiency because of having a plurality of scraper mechanisms.

To solve the above technical problem, an embodiment of the present invention provides a sweeping device for the photovoltaic panel applied to a photovoltaic unit composed by N photovoltaic panel arrays arranged in sequence, wherein the sweeping device comprises a guide rail mechanism composed by an upper rail and a lower rail respectively disposed on an upper side and a lower side of the photovoltaic panel array and a scraper mechanism distributed on the guide rail mechanism, and each photovoltaic panel array corresponds to one scraper mechanism separately;

wherein N is a natural number greater than one, and each photovoltaic panel array is composed by M photovoltaic panels arranged one above the other in sequence, and M is an even number greater than two;

the sweeping device for the photovoltaic panel further comprises a driving mechanism for driving a respective scraper mechanism to move along a longitudinal direction of the guide rail mechanism, and the driving mechanism is disposed on a back of the photovoltaic unit, and the driving mechanism comprises a pull rope component connected with a respective scraper mechanism and a driving component connected with the pull rope component;

wherein the pull rope component comprises a top portion and a tail portion, the driving component comprises a first reel connected to the top portion of the pull rope component, a second reel connected to the tail portion of the pull rope component, and a driver member for driving the first reel or the second reel to rotate.

When this embodiment is compared with the prior art, the whole sweeping device is composed by the guide rail mechanism, the scraper mechanism, and the driving mechanism. Wherein the upper rail and the lower rail in the guide rail mechanism are respectively disposed on an upper side and a lower side of the photovoltaic panel array, the driving mechanism is disposed on a back of the photovoltaic unit, and the driving mechanism comprises a pull rope component connected with a respective scraper mechanism and a driving component connected with the pull rope component. In addition, the top portion of the pull rope component is connected with the first reel in the driving component and the tail portion of the pull rope component is connected with a second reel in the driving component. Thus, in practical applications, when the first reel or the second reel is driven by the driver member, the pull rope component can be made to drive the respective scraper mechanism from an opposite direction to move on the guide rail mechanism, so that a direction switching operation is implemented when the respective scraper mechanism cleans its corresponding photovoltaic panel array, sweeping on surface of the respective photovoltaic panel array is completed, and power generation efficiency of the whole photovoltaic unit is improved. Compared to the use of a robot, not only that the structure is simple and the cost is low, but also the photovoltaic panel arrays can be cleaned simultaneously, because the sweeping device has a plurality of scraper mechanisms, sweeping efficiency for a plurality of photovoltaic panel arrays is improved.

In an example, the pull rope mechanism comprises a pull-up rope connected to a top portion of a respective scraper mechanism and a pull-down rope connected to a tail portion of a respective scraper mechanism. Since the pull-up rope and the pull-down rope are respectively connected with the top portion and the tail portion of the respective scraper mechanism, the respective scraper mechanism can follow a driving direction of the pull-up rope and the pull-down rope to slide toward a start position of its corresponding photovoltaic panel array when the driver member drives the first reel to pull the top portion of the pull-up rope and the pull-down rope, also, the respective scraper mechanism can follow a driving direction of the pull-up rope and the pull-down rope to slide toward an end position of its corresponding photovoltaic panel array when the driver member drives the first reel to pull the tail portions of the pull-up rope and the pull-down rope, sliding of the respective scraper mechanism on the guide rail mechanism is realized in this manner.

In an example, the driver member is located at a center position of the photovoltaic unit. Thus, better stability and reliability are achieved when the pull rope component drives the scraper mechanism to slide along the guide rail mechanism.

In an example, the scraper mechanism comprises a crossbeam slidably connected with the upper rail and the lower rail, and L blades disposed on the crossbeam; wherein L is a natural number. When L is 3 and the blades are distributed on the crossbeam in shape of a tripod, as the crossbeam on the scraper mechanism is made to drive the respective blades to clean the photovoltaic panel array under the action of the pull rope component, a longitudinal area of each photovoltaic panel can be covered, so as to avoid a phenomenon of blind spots during sweeping, thereby better sweeping effect can be achieved.

In an example, the blade comprises a blade body and a blade holder for fixing the blade body, and the blade body is an elastic member. Thus, the blade body can be closely attached to an upper surface of each photovoltaic panel when sweeping the photovoltaic panel array, so as to achieve good sweeping effect, and the blade can be prevented from damaging the surface of the photovoltaic panel array during the sweeping process.

In an example, the blade body has a blade edge portion that clings to the surface of the photovoltaic panel and a left-turn groove and a right-turn groove that are opened on the blade edge portion. Thus, during the sweeping process, the blade body can be bent closely against the surface of the photovoltaic panel under the action of the left-turn and right-turn grooves, and the blade body can be prevented from damaging the surface of the photovoltaic panel array during the sweeping process.

In an example, the upper rail and the lower rail have the same shape, and sectional shapes of the upper rail and the lower rail are a hollow structure with a notch, the hollow portion constitutes a cavity of the upper rail and the lower rail, and the guide above the notch forms a cap for covering the cavity; wherein the pull-up rope partially penetrates through the cavity of the upper rail, and the pull-down rope partially penetrates through the cavity of the lower rail, and a bottom of a respective crossbeam is provided with an upper connecting plate that is inserted into the notch of the upper rail and a lower connecting plate that is inserted into the notch of the lower rail respectively, and the upper and lower connecting plates on a respective crossbeam are fixedly connected with the pull-up and pull-down ropes located in the cavity of the upper rail and the lower rail. Since the upper rail and the lower rail are a hollow structure with a notch each, and the hollow portion constitutes a cavity of the upper rail and the lower rail, when the pull-up and pull-down ropes are connected with their respective crossbeams through the upper connecting plate and the lower connecting plate, they can pass through the cavity of the upper rail and the lower rail, and protect the pull-up and pull-down ropes through the caps on the cavity, so that the pull-up and pull-down ropes can be driven inside the upper and lower rails, which prevents the pull-up and pull-down ropes from being exposed externally. In this way, the pull-up and pull-down ropes can be prevented from being broken or damaged or the like due to icing or corrosion under extreme conditions.

In an example, the upper and lower connecting plates each comprise a vertical connecting portion fixedly connected with the crossbeam; and the upper connecting plate and the lower connecting plate each further comprise a hook portion inserted into a guide cavity from a guide notch and fixedly connected with the pull rope in the guide cavity corresponding thereto: wherein the hook portions of the upper and lower connecting plates are respectively suspended in the cavity of the upper rail and the lower rail. Thus, during the process that the pull-up and pull-down ropes pull the crossbeams to slide, because the upper and lower connecting plates are suspended in the cavity of the respective guides, the hooks of the upper and lower connecting plates do not cause resistance to sliding of the crossbeams, which makes the crossbeams smoother when sliding, and reduces the noise generated when a trolley slides to a certain extent.

Another embodiment of the present invention further provides a sweeping device for the photovoltaic panel applied to a photovoltaic unit composed by N photovoltaic panel arrays arranged in sequence, wherein the sweeping device comprises a guide rail mechanism composed by an upper rail and a lower rail respectively disposed on an upper side and a lower side of a respective photovoltaic panel array, and a scraper mechanism slidably disposed on the guide rail mechanism; wherein N is a natural number greater than one, the scraper mechanism is one in terms of number, and each photovoltaic panel array is composed by M photovoltaic panels arranged one above the other in sequence, and M is an even number greater than two;

the sweeping device for the photovoltaic panel further comprises a driving mechanism for driving the scraper mechanism to move along a longitudinal direction of the guide rail mechanism, and the driving mechanism is disposed on a back of the photovoltaic unit, and the driving mechanism comprises a pull rope component connected with the scraper mechanism and a driving component connected with the pull rope component;

wherein the pull rope component comprises a top portion and a tail portion, and the driving component comprises a first reel connected to the top portion of the pull rope component, a second reel connected to the tail portion of the pull rope component, and a driver member for driving the first reel or the second reel to rotate.

When this embodiment is compared with the prior art, the whole sweeping device is composed by the guide rail mechanism, the scraper mechanism, and the driving mechanism. Wherein the upper rail and the lower rail in the guide rail mechanism are respectively disposed on the upper side and the lower side of the photovoltaic panel array, the driving mechanism is disposed on a back of the photovoltaic unit, and the driving mechanism comprises a pull rope component connected with the scraper mechanism and a driving component connected with the pull rope component. In addition, the top portion of the pull rope component is connected with a first reel in the driving component and the tail portion of the pull rope component is connected with a second reel in the driving component. Thus, during practical applications, when the first reel or the second reel is driven by the driver member, the pull rope component can be made to drive the scraper mechanism from an opposite direction to move on the guide rail mechanism, so that a direction switching operation is implemented when the scraper mechanism cleans its corresponding photovoltaic panel array, sweeping on surface of the respective photovoltaic panel array is completed, and power generation efficiency of the whole photovoltaic unit is improved. Compared to the use of a robot, it only needs to install one scraper mechanism, then the photovoltaic panel arrays can be cleaned, structure is simplified, cost is reduced.

In an example, the pull rope component comprises a pull-up rope connected to a top portion of the scraper mechanism and a pull-down rope connected to a tail portion of the scraper mechanism. Since the pull-up rope and the pull-down rope are connected with the top portion and the tail portion of the scraper mechanism respectively, the scraper mechanism can follow a driving direction of the pull-up rope and the pull-down rope to slide toward a start position of its corresponding photovoltaic panel array when the driver member drives the first reel to pull the top portions of the pull-up rope and the pull-down rope, also the scraper mechanism can follow the driving direction of the pull-up rope and the pull-down rope to slide toward an end position of its corresponding photovoltaic panel array when the driver member drives the first reel to pull the tail portions of the pull-up rope and the pull-down rope, sliding of the scraper mechanism on the guide rail mechanism is realized in this manner.

In an example, the driver member is located at a center position of the photovoltaic unit. Thus, better stability and reliability are achieved when the pull rope component drives the scraper mechanism to slide along the guide rail mechanism.

In an example, the scraper mechanism comprises a crossbeam slidably connected with the upper rail and the lower rail, and L blades disposed on the crossbeam; wherein L is a natural number. When L is 3 and the blades are distributed on the crossbeam in shape of a tripod, as the crossbeam on the scraper mechanism is made to drive the respective blades to clean the photovoltaic panel arrays under the action of the pull rope component, a longitudinal area of each photovoltaic panel can be covered, so as to avoid a phenomenon of blind spots during sweeping, thereby better sweeping effect can be achieved.

In an example, the blade comprises a blade body and a blade holder for fixing the blade body, and the blade body is an elastic member. Thus, the blade body can be closely attached to an upper surface of each photovoltaic panel when sweeping the photovoltaic panel array, so as to achieve good sweeping effect, and the blade can be prevented from damaging the surface of the photovoltaic panel array during the sweeping process.

In an example, the blade body has a blade edge portion that clings to the surface of the photovoltaic panel and a left-turn groove and a right-turn groove that are opened above the blade edge portion. Thus, during the sweeping process, the blade body can be bent closely against the surface of the photovoltaic panel under the action of the left-turn and right-turn grooves, and the blade body can be prevented from damaging the surface of the photovoltaic panel array during the sweeping process.

In an example, the upper rail and the lower rail have the same shape, and sectional shapes of the upper rail and the lower rail are a hollow structure with a notch, the hollow portion constitutes a cavity of the upper rail and the lower rail, and the guide above the notch forms a cap for covering the cavity; wherein the pull-up rope partially penetrates through the cavity of the upper rail, and the pull-down rope partially penetrates through the cavity of the lower rail, and a bottom of a respective crossbeam is provided with an upper connecting plate that is inserted into the notch of the upper rail and a lower connecting plate that is inserted into the notch of the lower rail respectively, and the upper and lower connecting plates on a respective crossbeam are fixedly connected with the pull-up and pull-down ropes located in the cavity of the upper rail and the lower rail. Since the upper rail and the lower rail are a hollow structure with a notch each, and the hollow portion constitutes the cavity of the upper rail and the lower rail, when the pull-up and pull-down ropes are connected with their respective crossbeams through the upper connecting plate and the lower connecting plate, they can pass through the cavity of the upper rail and the lower rail, and protect the pull-up and pull-down ropes through the caps on the cavity, so that the pull-up and pull-down ropes can be driven inside the upper and lower rails, which prevents the pull-up and pull-down ropes from being exposed externally. In this way, the pull-up and pull-down ropes can be prevented from being broken or damaged or the like due to icing or corrosion under extreme conditions.

In an example, the upper and lower connecting plates each comprise a vertical connecting portion fixedly connected with the crossbeam; and the upper connecting plate and the lower connecting plate each further comprise a hook portion inserted into a guide cavity from a guide notch and fixedly connected with the pull rope in the guide cavity corresponding thereto; wherein the hook portions of the upper and lower connecting plates are respectively suspended in the cavity of the upper rail and the lower rail. Thus, during the process that the pull-up and pull-down ropes pull the crossbeams to slide, because the upper and lower connecting plates are suspended in the cavity of the respective guides, the hooks of the upper and lower connecting plates do not cause resistance to sliding of the crossbeams, which makes the crossbeams smoother when sliding, and reduces the noise generated when a trolley slides to a certain extent.

In addition, an embodiment of the present invention further provides a sweeping device for the photovoltaic panel applied to a photovoltaic unit composed by N photovoltaic panel arrays arranged in sequence, wherein the sweeping device comprises a guide rail mechanism composed by an upper rail and a lower rail respectively disposed on an upper side and a lower side of a respective photovoltaic panel array, and a scraper mechanism respectively disposed on a respective guide rail mechanism, N being a natural number;

the sweeping device further comprises a pull rope mechanism for pulling a respective scraper mechanism to move in a longitudinal direction of the guide rail mechanism; wherein the pull rope component comprises a pull-up rope connected to a top portion of a respective scraper mechanism and a pull-down rope connected to a tail portion of a respective scraper mechanism, the pull-up rope partially penetrates through the upper rail of a respective guide rail mechanism, and the pull-down rope partially penetrates through the lower rail of a respective guide rail mechanism;

wherein at least a portion of the upper rail is a first detachable section for disconnecting the upper rail, and at least a portion of the lower rail is a second detachable section for disconnecting the lower rail;

wherein lengths of the first detachable section and the second detachable section are the same and are greater than a width of the scraper mechanism, and positions of the first detachable section and the second detachable section correspond to each other.

Compared with the prior art, this embodiment may enable the sweeping device of the present invention to meet more complex topography situations and application scenarios.

In addition, an embodiment of the present invention further provides a sweeping device for the photovoltaic panel applied to a photovoltaic unit composed by N photovoltaic panel arrays arranged in sequence, wherein the sweeping device comprises a guide rail mechanism composed by an upper rail and a lower rail respectively disposed on an upper side and a lower side of a respective photovoltaic panel array, and a scraper mechanism respectively disposed on a respective guide rail mechanism, N being a natural number;

the sweeping device further comprises a pull rope mechanism for pulling a respective scraper mechanism to move in a longitudinal direction of the guide rail mechanism; wherein the pull rope component comprises a pull-up rope connected to a top portion of a respective scraper mechanism and a pull-down rope connected to a tail portion of a respective scraper mechanism, the pull-up rope partially penetrates through the upper rail of a respective guide rail mechanism, and the pull-down rope partially penetrates through the lower rail of a respective guide rail mechanism;

wherein at least a portion of the upper rail is a first detachable section for disconnecting the upper rail, and at least a portion of the lower rail is a second detachable section for disconnecting the lower rail; wherein lengths of the first detachable section and the second detachable section are the same and are greater than a width of the scraper mechanism, and positions of the first detachable section and the second detachable section correspond to each other.

When this embodiment is compared with the prior art, since the upper and the lower rails of the whole sweeping device have the first and second detachable sections respectively, an operator can conveniently remove the scraper mechanism out of a removed part of the first and the second detachable sections and run an overhaul, and a damaged part of the pull-up and pull-down ropes can be exposed at the removed part through reel-in and reel-out movement of the pull-up rope or the pull-down rope. The damaged part of the pull-up and pull-down ropes can be cut off by the operator conveniently and reconnection can be made without removing the whole pull-up guide or pull-down guide, thereby it facilitates maintenance of the scraper mechanism and the pull-up and pull-down ropes by the operator, working efficiency is improved, and maintenance cost is reduced.

In an example, in order to meet installment requirements in practical applications and improve overhaul efficiency, the first detachable section is disposed at any position of the upper rail, and the second detachable section is disposed at any position of the lower rail. As can be known, the first and second detachable sections may be properly set by the operator at any position on the upper and lower rails according to an actual situation, so that the operator can conveniently remove the scraper mechanism from the upper rail and the lower rail.

In an example, a length of the first detachable section is less than a length of each of the two parts where the upper rail is disconnected, and a length of the second detachable section is less than a length of each of the two sections where the lower rail is disconnected. Since the lengths of the first and second detachable sections are respectively smaller than the length of each of the two parts where the upper and lower rails are disconnected, the lengths of the two parts where the upper and lower rails are disconnected are longer, strength of the upper rail and the lower rail can be enhanced.

In an example, the first detachable section is further locked and fixed with the two parts where the upper rail is disconnected through an upper locking assembly, the second detachable section is further locked and fixed with the two parts where the lower rail is disconnected through a lower locking assembly. Thus, during the process that the pull rope drives the scraper mechanism to move on the upper rail and the lower rail, the first detachable section and the second detachable section are respectively fixed by the upper and lower locking assembly, so that the first detachable section and the second detachable section do not slide or loosen in the upper rail or the lower rail, thereby it is ensured that the scraper mechanism can perform stable movement in the upper rail and the lower rail.

In an example, the upper locking assembly comprises a first upper fixing bracket and a second upper fixing bracket slidably disposed on the two parts where the upper rail is disconnected respectively, a first upper locking member disposed on the first upper fixing bracket, and a second upper locking member disposed on the second upper fixing bracket; wherein the first upper locking member is locked and fixed when the first upper fixing bracket slides to a joint site of a disconnected part on the upper rail corresponding thereto and the first detachable section; the second upper locking member is locked and fixed when the second upper fixing bracket slides to a joint site of a disconnected part on the upper rail corresponding thereto and the first detachable section. As can be known, since the first upper fixing bracket and the second upper fixing bracket are slidably disposed on the upper rail, when the first detachable section is connected with the two parts where the upper rail is disconnected, the first upper fixing bracket and the second upper fixing bracket can be slide to a joint site of the two parts where the upper rail corresponding thereto is disconnected and the first detachable section; and the first and second upper fixing brackets are respectively locked and fixed through the first and second upper locking members, so that the first detachable section is fixedly connected to the two parts where the upper rail is disconnected. When removing the first detachable section, it only needs to slide the first upper fixing bracket and the second upper fixing bracket respectively to the two parts where the upper rail is disconnected after the first and second upper locking members are released. As such, a locking force for the first detachable section and the two parts where the upper rail is disconnected can be cancelled to facilitate removal of the first detachable section by the operator.

In an example, an upper rail groove is set on the first upper fixing bracket and the second upper fixing bracket respectively, the first detachable section and the two parts where the upper rail is disconnected respectively have an upper insertion portion for being inserted into the upper rail groove; wherein groove walls at two sides of the upper rail groove gradually gather from the bottom to the top toward the center of the upper rail groove, a cross-sectional shape of the upper insertion portion and a cross-sectional shape of the upper rail groove are the same, and after the upper insertion portion is inserted into the upper rail groove, the upper insertion portion is locked and fixed by means of that the upper insertion portion is undercut by the groove walls on the upper rail groove sides. Because the first and second upper fixing brackets are respectively provided with upper rail grooves, the first detachable section and the two parts where the upper rail is disconnected respectively have an upper insertion portion for being inserted into the upper rail groove, and groove walls at two sides of the upper rail groove gradually gather from the bottom to the top toward the center of the upper rail groove, so that after the first detachable section of the upper rail is inserted into the upper rail groove, and the first detachable section and the upper insertion portion of the upper rail can be locked and fixed through groove walls at two sides of the upper trail groove, so as to realize the installation between the first detachable section, the upper rail and the first and second upper fixing brackets.

In an example, the first upper locking member and the second upper locking member are screw bolts.

In an example, the lower locking assembly comprises a first lower fixing bracket and a second lower fixing bracket slidably disposed on two parts where the lower rail is disconnected respectively, a first lower locking member disposed on the first lower fixing bracket, and a second lower locking member disposed on the second lower fixing bracket; wherein the first lower locking member is locked and fixed when the first lower fixing bracket slides to a joint site of a disconnected part on the lower rail corresponding thereto and the second detachable section; the second lower locking member is locked and fixed when the second lower fixing bracket slides to a joint site of a disconnected part on the lower rail corresponding thereto and the second detachable section. As can be known, since the first lower fixing bracket and the second lower fixing bracket are slidably disposed on the lower rail, when the second detachable section is connected with the two parts where the lower rail is disconnected, the first lower fixing bracket and the second lower fixing bracket may be slide to a joint site of the two parts where the lower rail corresponding thereto is disconnected and the second detachable section, and the first and second lower fixing brackets are respectively locked and fixed through the first and second lower locking members, so that the second detachable section is fixedly connected to the two parts where the lower rail is disconnected. When removing the second detachable section, it only needs to slide the first lower fixing bracket and the second lower fixing bracket respectively to the two parts where the lower rail is disconnected after the first and second lower locking members are released. As such, a locking force for the second detachable section and the two parts where the lower rail is disconnected can be cancelled to facilitate removal of the second detachable section by the operator.

In an example, a lower rail groove is set on the first lower fixing bracket and the second lower fixing bracket respectively, the second detachable section and the two parts where the lower rail is disconnected respectively have a lower insertion portion for being inserted into the lower rail groove; wherein groove walls at two sides of the lower rail groove gradually gather from the bottom to the top toward the center of the lower rail groove, a cross-sectional shape of the lower insertion portion and a cross-sectional shape of the lower rail groove are the same, and after the lower insertion portion is inserted into the lower rail groove, the lower insertion portion is locked and fixed by means of that the lower insertion portion is undercut by the groove walls on the lower rail groove sides. Because the first and second lower fixing brackets are respectively provided with lower rail grooves, the second detachable section and the two parts where the lower rail is disconnected respectively have a lower insertion portion for being inserted into the lower rail groove, and groove walls at two sides of the lower rail groove gradually gather from the bottom to the top toward the center of the lower rail groove, so that after the second detachable section of the lower rail is inserted into the lower rail groove, and the second detachable section and the lower insertion portion of the lower rail can be locked and fixed through groove walls at two sides of the lower trail groove, so as to realize the installation between the second detachable section, the lower rail and the first and second lower fixing brackets.

In an example, the first lower locking member and the second lower locking member are screw bolts.

In addition, the present invention provides a sweeping device for the photovoltaic panel applied to a photovoltaic unit composed by N photovoltaic panel arrays arranged in sequence, wherein the sweeping device comprises a guide rail mechanism composed by an upper rail and a lower rail respectively disposed on an upper side and a lower side of a respective photovoltaic panel array, and a scraper mechanism respectively disposed on a respective guide rail mechanism;

wherein N is a natural number greater than one, said sweeping device further comprises a pull rope mechanism for pulling a respective scraper mechanism to move in a longitudinal direction of the guide rail mechanism and a driving mechanism connected with the pull rope mechanism;

the pull rope component comprises a pull-up rope connected to a top portion of a respective scraper mechanism and a pull-down rope connected to a tail portion of a respective scraper mechanism, the pull-up rope partially penetrates through the upper rail of a respective guide rail mechanism, and the pull-down rope partially penetrates through the lower rail of a respective guide rail mechanism, opposite ends of the upper rails of every two adjacent guide rail mechanisms are respectively provided with an upper rail sleeve for guiding the pull-up rope, and opposite ends of the lower rails of every two adjacent guide rail mechanisms are respectively provided with a lower rail sleeve for guiding the pull-down rope; wherein the upper and lower rail sleeves have the same structure, and each have a rolling component that resists their corresponding pull rope in interior respectively.

When this embodiment is compared with the prior art, in the whole sweeping device, opposite ends of the upper and lower rails of every two adjacent guide rail mechanisms are respectively provided with an upper rail sleeve and a lower rail sleeve for guiding the pull-up rope and the pull-down rope, respectively; and the upper rail sleeve and the lower rail sleeve are of the same structures, and each have a rolling component that resists their corresponding pull rope in interior respectively. Thus, in practical applications, when the rolling components in the upper and lower rail sleeves enable the pull rope to drive the scraper mechanism to perform sweeping movement on the photovoltaic panel, contact between the pull rope and the guide rail mechanism can be avoided, not only wearing caused by the pull rope drives the scraper mechanism to move can be reduced, but also it facilitates maintenance of the sweeping device. Maintenance cost of the sweeping device is reduced, and structure of the whole sweeping device is also simplified.

In an example, the rolling component comprises a first roller, a second roller symmetrically arranged with respect to the first roller, as well as a first rotor shaft for fixing the first roller, a second rotor shaft for fixing the second roller; wherein an inner concave portion where the pull-up rope or the pull-down rope can be embedded is formed on a circumferential surface of the first roller and the second roller, and a position where the inner concave portion of the first roller and the second roller fit constitutes a pull rope accommodation area that can be penetrated by the pull-up rope or the pull-down rope. Since the first roller and the second roller are disposed symmetrically, and are respectively fixed by the first rotor shaft and the second rotor shaft, a position where the inner concave portion of the first roller and the second roller fit constitutes a pull rope accommodation area that can be penetrated by the pull-up rope or the pull-down rope. Thereby, in practical applications, after the pull rope penetrates through the pull rope accommodation area, when the pull-up rope and the pull-down rope drive the scraper mechanism to move along the upper rail and the lower rail, under the action of the first roller and the second roller, it is possible that the pull-up rope and the pull-down rope pass through the guide rail mechanism without contacting an inner surface of the upper rail and the lower rail, and because the inner concave portion that constitutes the pull rope accommodation area is a circumferential surface, contact area between the first roller and the second roller can be reduced, and further frictional resistance to the pull-up and pull-down ropes can be reduced, thereby wearing of the pull-up and pull-down ropes can be reduced.

In an example, a width of the inner concave portion of the first roller and the inner concave portion of the second roller is greater than a sectional diameter of the pull-up and pull-down ropes, and a depth of the inner concave portion of the first roller and the inner concave portion of the second roller is greater than a sectional radius of the pull-up and pull-down ropes. Thus, during installment of the sweeping device by the operator, the pull rope can be accommodated by the inner concave portion of the first roller and the inner concave portion of the second roller.

In an example, in order to meet requirement of installment between the upper and lower rail sleeves and the pull ropes in practical applications, the first roller and the second roller are butted against each other or are separated from each other; when the first roller and the second roller are separated from each other, the first roller and the second roller are spaced apart from each other by a distance smaller than the cross-sectional diameter of the pull-up and pull-down ropes; and when the first roller and the second roller are butted against each other, the pull rope accommodation area is a closed annular area.

In an example, the rolling component further comprises first and second baffle plates symmetrically disposed on two sides of the first roller and the second roller, and the first baffle plate and the second baffle plate completely block at least the site where the first roller and the second roller fit. Thus, during the process of driving the scraper mechanism by the pull rope, the first baffle plate and the second baffle plate can play the role of limiting the pull-up and pull-down ropes, so that the pull rope is always located on the site where the first roller and the second roller cooperate.

In an example, in order to facilitate installation and replacement of the upper and lower rail sleeves in practical applications, the upper rail sleeve is detachably connected with the upper rail, and the lower rail sleeve is detachably connected with the lower rail.

In an example, the upper rail sleeve has an inner cavity for being inserted by the upper rail, and a shape of the inner cavity of the upper rail sleeve is the same as an outer shape of the upper rail, and after the upper rail is inserted into the inner cavity of the upper rail sleeve, the upper rail sleeve is fixed together with the upper rail by screw bolts; the lower rail sleeve has an inner cavity for being inserted by the lower rail, and a shape of the inner cavity of the lower rail sleeve is the same as an outer shape of the lower rail, and after the lower rail is inserted into the inner cavity of the lower rail sleeve, the lower rail sleeve is fixed together with the lower rail by screw bolts. This facilitates installation between the upper and lower rail sleeves and the upper and lower rails.

In an example, the upper rail and the lower rail have the same shape, and sectional shapes of the upper rail and the lower rail are a hollow structure with a notch, the hollow portion constitutes the cavity of the upper rail and the lower rail, and the guide above the notch forms a cap for covering the cavity; wherein the pull-up rope partially penetrates through the cavity of the upper rail, and the pull-down rope partially penetrates through the cavity of the lower rail, and a bottom of a respective scraper mechanism is respectively provided with an upper connecting plate that is inserted into the notch of the upper rail and a lower connecting plate that is inserted into the notch of the lower rail, and the upper and lower connecting plates on a respective scraper mechanism are fixedly connected with the pull-up and pull-down ropes located in the cavity of the upper rail and the lower rail. Since the upper rail and the lower rail are a hollow structure with a notch each, and the hollow portion constitutes the cavity of the upper rail and the lower rail, when the pull-up and pull-down ropes are connected with their respective scraper mechanisms through the upper connecting plate and the lower connecting plate, they can pass through the cavity of the upper rail and the lower rail, and protect the pull-up and pull-down ropes through the caps on the cavity, so that the pull-up and pull-down ropes can be driven inside the upper and lower rails, which prevents the pull-up and pull-down ropes from being exposed externally. In this way, the pull-up and pull-down ropes can be prevented from being broken or damaged or the like due to icing or corrosion under extreme conditions.

In an example, the upper and lower connecting plates each comprise a vertical connecting portion fixedly connected with the scraper mechanism; and the upper connecting plate and the lower connecting plate respectively further comprises a hook portion inserted into a guide cavity from a guide notch and fixedly connected with the pull rope in the guide cavity corresponding thereto; wherein the hook portions of the upper and lower connecting plates are respectively suspended in the cavity of the upper rail and the lower rail. Thus, during the process that the pull-up and pull-down ropes pull the scraper mechanism to slide, because the upper and lower connecting plates are suspended in the cavities of the respective guides, the hooks of the upper and lower connecting plates do not cause resistance to sliding of the scraper mechanisms, which makes the scraper mechanisms smoother when sliding, and reduces the noise generated when the scraper mechanism slides to a certain extent.

DETAILED DESCRIPTION

To make the objectives, technical solutions, and advantages of the present invention to be more comprehensible, various examples in some embodiments of the present invention will be described in detail below by way of example with reference to the accompanying drawings. However, as will be appreciated by a person of ordinary skill in the art, in various examples, many technical details have been provided in order to make the reader better understand the present application. However, even without these technical details and various changes and modifications based on the following examples, the technical solutions claimed by the claims of the present application can also be implemented.

Figure 1:
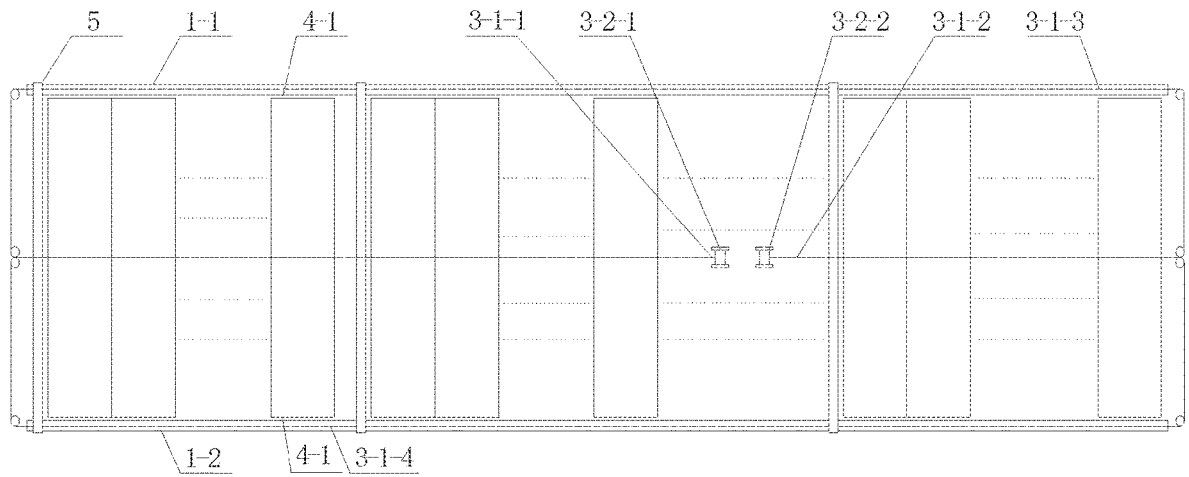
FIG. 1 is a schematic diagram of structure of a sweeping device for the photovoltaic panel in a first example of some embodiments of the present invention.

A first example relates to a sweeping device for the photovoltaic panel, as shown in FIG. 1, the sweeping device is applied to a photovoltaic unit composed by a plurality of photovoltaic panel arrays arranged in sequence. However, in this example, a plurality of photovoltaic panels 4-1 in each photovoltaic panel array are arranged in two columns in sequence, an upper column and a lower column, and the two columns of photovoltaic panels 4-1 are arranged symmetrically.

In addition, as shown in FIG. 1, the sweeping device for the photovoltaic panel in this example further comprises a guide rail mechanism composed by an upper rail 1-1 and a lower rail 1-2 respectively disposed on an upper side and a lower side of the photovoltaic unit a scraper mechanism 5 distributed on the guide rail mechanism, and a driving mechanism for driving a respective scraper mechanism 5 to move along a longitudinal direction of the guide rail mechanism. Wherein, as shown in FIG. 1, the driving mechanism is disposed on a back of the photovoltaic unit, and comprises a pull rope component connected with a respective scraper mechanism 5 and a driving component connected with the pull rope component. And as shown in FIG. 1, the pull rope component comprises a top portion 3-1-1 and a tail portion 3-1-2, the top portion 3-1-1 of the pull rope component is connected to a first reel 3-2-1, the tail portion 3-1-2 of the pull rope component is connected to a second reel 3-2-2, and the driving component comprises a first reel 3-2-1 connected to the top portion 3-1-1 of the pull rope component, a second reel 3-2-2 connected to the tail portion 3-1-2 of the pull rope component, and a driver member (not shown) for driving the first reel 3-2-1 or the second reel 3-2-2 to rotate.

It is not difficult to find from the above content that, the whole sweeping device is composed by the guide rail mechanism, the scraper mechanism 5, and the driving mechanism. Wherein, an upper rail 1-1 and a lower rail 1-2 in the guide rail mechanism are respectively disposed on an upper side and a lower side of the photovoltaic unit, the driving mechanism is disposed on a back of the photovoltaic unit, and the driving mechanism comprises a pull rope component connected with a respective scraper mechanism 5 and a driving component connected with the pull rope component. In addition, the top portion 3-1-1 of the pull rope component is connected with the first reel 3-2-1 in the driving component and the tail portion 3-1-2 of the pull rope component is connected with the second reel 3-2-2 in the driving component. Thus, in practical applications, when the first reel 3-2-1 or the second reel 3-2-2 is driven by the driver member, the pull rope component can be made to drive the respective scraper mechanism 5 from an opposite direction to move on the guide rail mechanism, so that a direction switching operation is implemented when the respective scraper mechanism 5 cleans its corresponding photovoltaic panel array, sweeping on surface of the respective photovoltaic panel array is completed, and power generation efficiency of the whole photovoltaic unit is improved. Compared to the use of a robot, not only that the structure is simple and the cost is low, but also because the sweeping device has a plurality of scraper mechanisms 5, the photovoltaic panel arrays can be cleaned simultaneously, sweeping efficiency for a plurality of photovoltaic panel arrays is improved.

Specifically, in this example, in FIG. 1, the respective photovoltaic panel arrays in the photovoltaic unit in this embodiment may be set as N, and arranged in a straight line. And, in order to enable the respective scraper mechanism 5 to slide back and forth between the start position and the end position of its corresponding photovoltaic panel array, the driving mechanism is disposed on a back of the photovoltaic unit, and the driving mechanism comprises a pull rope component composed by the pull-up rope 3-1-3 and the pull-down rope 3-1-4 that pull the respective scraper mechanism 5 to slide on the guide rail mechanism. Wherein, as shown in FIG. 1, the pull-up rope 3-1-3 is connected with the top portion of the respective scraper mechanism 5, the pull-down rope, the pull-down rope 3-1-4 is connected with the tail portion 3-1-2 of the respective scraper mechanism 5.

As can be known from the above content, since the pull-up rope 3-1-3 and the pull-down rope 3-1-4 are respectively connected with the top portion and the tail portion 3-1-2 of the respective scraper mechanism 5, the respective scraper mechanism 5 can follow a driving direction of the pull-up rope and the pull-down rope to slide toward a start position of its corresponding photovoltaic panel array when the driver member drives the first reel 3-2-1 to pull the top portions 3-1-1 of the pull-up rope 3-1-3 and the pull-down rope 3-1-4, also, the respective scraper mechanism 5 can follow a driving direction of the pull-up rope and the pull-down rope to slide toward an end position of its corresponding photovoltaic panel array when the driver member drives the first reel 3-2-2 to pull the tail portions 3-1-2 of the pull-up rope 3-1-3 and the pull-down rope 3-1-4, sliding of the respective scraper mechanism 5 on the guide rail mechanism is realized in this manner.

In addition, the driver member in the sweeping device in this example is located at a center position of the photovoltaic unit. Thus, better stability and reliability are achieved when the pull rope component drives the scraper mechanism 5 to slide along the guide rail mechanism.

Figure 2:
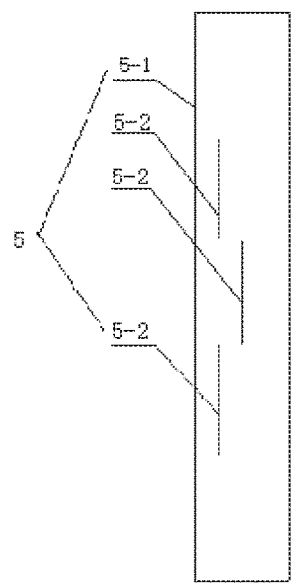
FIG. 2 is an installment diagram of blades on a crossbeam in the first example of some embodiments of the present invention.

In addition, for the sweeping device in this example to be capable of achieving better sweeping effect, in this example, as shown in FIG. 2, the scraper mechanism 5 may comprise a crossbeam 5-1 slidably connected with the upper rail 1-1 and the lower rail 1-2, and a plurality of blades 5-2 disposed on the crossbeam 5-1, in this example, the number of the blades 5-2 is set as 3, the blades are distributed on the crossbeam 5-1 in shape of a tripod, as shown in FIG. 2. Thus, as the crossbeam 5-1 on the scraper mechanism 5 is made to drive the respective blade 5-2 to clean the photovoltaic panel array under the action of the pull rope component, a longitudinal area of each photovoltaic panel 4-1 can be covered, so as to avoid a phenomenon of blind spots during sweeping, thereby better sweeping effect can be achieved. However, it should be noted that, the scraper mechanism 5 only comprises three blades 5-2 in this example, in practical application process, the number and distribution manner of the blades 5-2 may be appropriately increased or decreased based on area of the respective photovoltaic panel 4-1 in the photovoltaic panel array, and no specific limitation is made to the number of blades 5-2 in this example.

Figure 3:
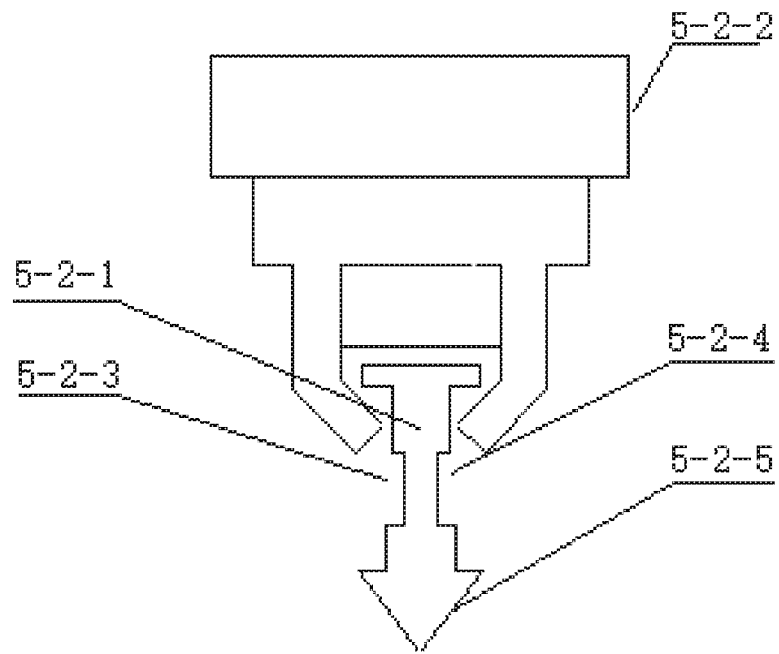
FIG. 3 is a schematic diagram of structure of blades in a second example of some embodiments of the present invention.

A second example relates to a sweeping device for the photovoltaic panel, the second example is a further improvement made based on the first example, its main improvement lies in: as shown in FIG. 3, in this example, the blade 5-2 may adopt the following structure, which comprises in specific: a blade body 5-2-1 and a blade holder 5-2-2 for fixing the blade body 5-2-1, and the blade body 5-2-1 is an elastic member.

It is not difficult to find from the above content that, the blade body 5-2-1 in this example is an elastic member, thereby it can be ensured that, when sweeping the photovoltaic panel array, the blade body 5-2-1 can be closely attached to an upper surface of each photovoltaic panel 4-1, so as to achieve good sweeping effect. In order to prevent the blade 5-2 from damaging the surface of the photovoltaic panel array 4 during the sweeping process, the blade holder 5-2-2 can be made of elastic materials such as rubber and silicone etc.

Figure 4:
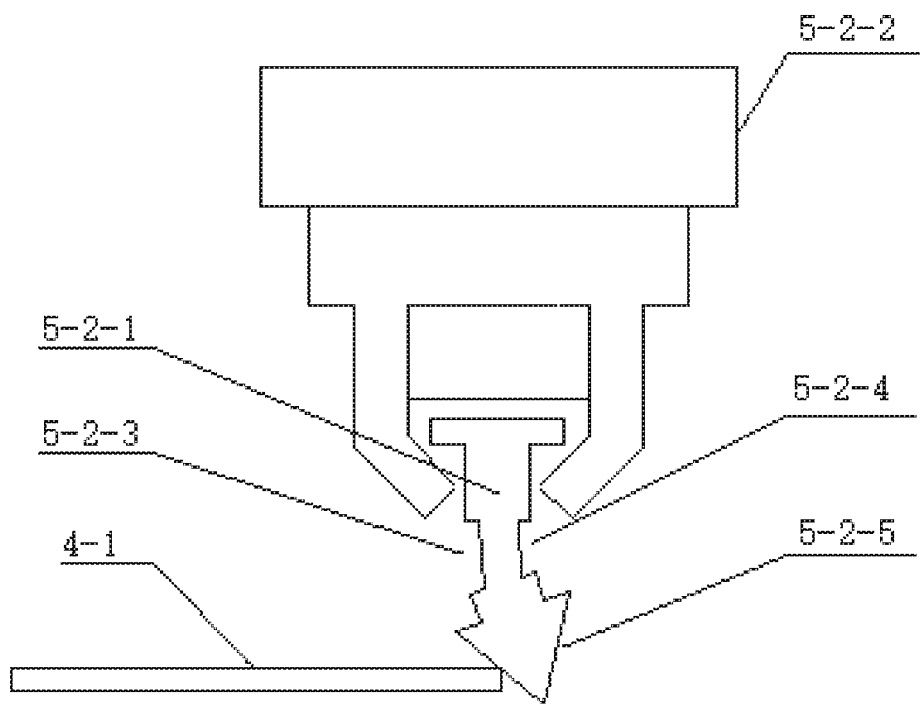
FIG. 4 is a schematic diagram of a state of blades when sweeping a photovoltaic panel in the second example of some embodiments of the present invention.

In addition, it is worth mentioning that, in this example, as shown in FIG. 4, the blade body 5-2-1 has a blade edge portion 5-2-5 that clings to the surface of the photovoltaic panel 4-1 and a left-turn 5-2-3 groove and a right-turn groove 5-2-4 that are opened on the blade edge portion 5-2-5. Thus, during the process of sweeping the photovoltaic panel 4-1, the blade body 5-2-1 can be bent closely against the surface of the photovoltaic panel 4-1 under the action of the left-turn groove 5-2-3 and the right-turn groove 5-2-4, and the blade body 5-2-1 can be prevented from damaging the surface of the photovoltaic panel array 4-1 during the sweeping process.

In addition, it should be noted that, when the blade body 5-2-1 is cross over the next photovoltaic panel 4-1, the blade edge portion 5-2-5 first abuts against an edge portion of the photovoltaic panel 4-1, and the blade body 5-2-1 is bent under the action of the left-turn groove and the right-turn groove, in a state shown in this figure, dirt on blade edge portion 5-2-5 of the blade body 5-2-1 is scraped off by a sharp part of the edge of the photovoltaic panel 4-1, so that self-sweeping effect is achieved after each sweeping of one photovoltaic panel 4-1.

Figure 5:
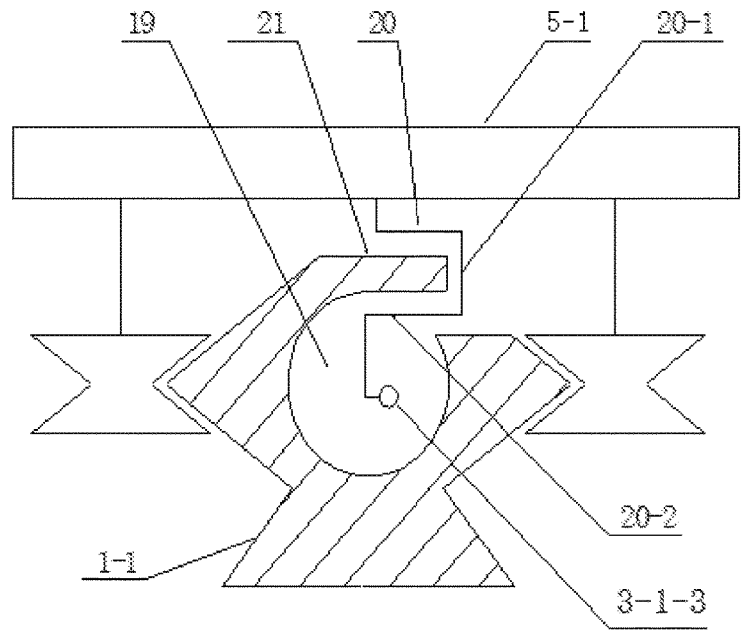
FIG. 5 is a schematic cross-sectional view of an upper rail in a third example of some embodiments of the present invention.

A third example relates to a sweeping device for the photovoltaic panel, the third example is roughly the same as the second example, the main difference lies in: as shown in FIG. 5, in this embodiment, the upper rail 1-1 and the lower rail 1-2 have the same shape, and sectional shapes of the upper rail 1-1 and the lower rail 1-2 are a hollow structure with a notch, the hollow portion constitutes a cavity 19 of the upper rail 1-1 and the lower rail 1-2, and the guide above the notch forms a cap 21 for covering the cavity 19; wherein the pull-up rope 3-1-3 partially penetrates through the cavity 19 of the upper rail 1-1, and the pull-down rope 3-1-4 partially penetrates through the cavity 19 of the lower rail 1-2, and a bottom of a respective crossbeam 5-1 is respectively provided with an upper connecting plate 20 that is inserted into the notch of the upper rail 1-1 and a lower connecting plate that is inserted into the notch of the lower rail 1-2, and the upper and lower connecting plates on a respective crossbeam 5-1 are fixedly connected with the pull-up and pull-down ropes located in the cavity 19 of the upper rail 1-1 and the lower rail 1-2.

Specifically, as shown in FIG. 5, in this example, a cross-sectional shape of the upper rail 1-1 and the lower rail 1-2 is a hollow structure with a notch, and the hollow portion constitutes the cavity 19 of the upper rail 1-1 and the lower rail 1-2, and the guide above the notch forms a cap 21 for covering the cavity 19.

Herein, since structures of the upper rail 1-1 and the lower rail 1-2 are the same, only the upper rail 1-1 will be described as an example in this embodiment. Specifically, the pull-up rope 3-1-3 may partially penetrate through the cavity 19 of the upper rail 1-1 when surrounding an upper rail roller set, and may be led out from the cavity 19 of the upper rail 1-1. The bottom of a respective crossbeam 5-1 is provided with an upper connecting plate 20 that is to be inserted into the notch of the upper rail 1-1, and the respective crossbeam 5-1 is fixedly connected with the pull-up rope 3-1-3 located in the cavity 19 of the upper rail 1-1 through the upper connecting plate 20, and the cap 21 is located on the cavity 19 for covering the cavity 19 and protecting the pull-up rope 3-1-3, so that the pull-up rope 3-1-3 can be prevented from being exposed externally when the pull-up rope 3-1-3 is driven inside the upper rail 1-1. In this way, the pull-up rope 3-1-3 can be prevented from being broken or damaged or the like due to icing or corrosion under extreme conditions.

In addition, for the respective crossbeam 5-1 to more smoothly slide on the guide rail mechanism, the upper connecting plate 20 comprises a vertical connecting portion 20-1 fixedly connected with the crossbeam 5-1, and a hook portion 20-2 inserted into the cavity 19 of the upper rail 1-1 from the notch of the upper rail 1-1 and fixedly connected with the pull-up rope in the cavity 19 of the upper rail 1-1. Wherein the hook portion 20-2 of the upper connecting plate 20 is suspended in the cavity 19 of the upper rail 1-1. A lower connecting plate may adopt a structure the same as that of the upper connecting plate 20.

Figure 6:
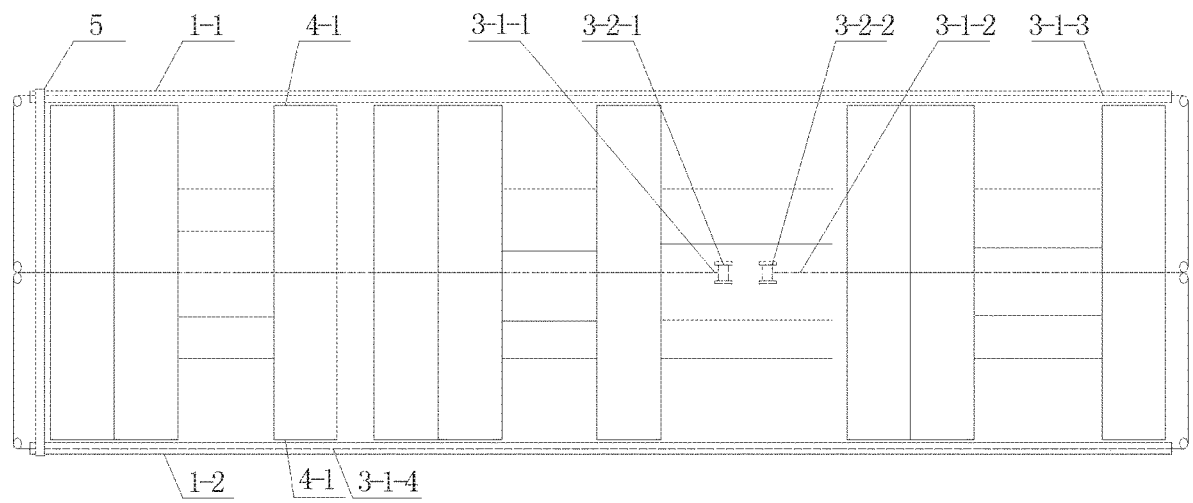
FIG. 6 is a schematic diagram of structure of a sweeping device for the photovoltaic panel according to a fourth example of some embodiments of the present invention.

A fourth example relates to a sweeping device for the photovoltaic panel, as shown in FIG. 6, the sweeping device is applied to a photovoltaic unit composed by a plurality of photovoltaic panel arrays arranged in sequence. In this example, a plurality of photovoltaic panels 4-1 in each photovoltaic panel array are arranged in two columns in order, an upper column and a lower column, and the two columns of photovoltaic panels 4-1 are arranged symmetrically.

In addition, as shown in FIG. 6, the sweeping device for the photovoltaic panel in this example further comprises a guide rail mechanism composed by an upper rail 1-1 and a lower rail 1-2, a scraper mechanism 5 slidably disposed on the guide rail mechanism respectively, and a driving mechanism for driving the scraper mechanism 5 to move along a longitudinal direction of the guide rail mechanism. Wherein, as shown in FIG. 6, the driving mechanism is disposed on a back of the photovoltaic unit, and comprises a pull rope component connected with the scraper mechanism 5 and a driving component connected with the pull rope component. And as shown in FIG. 6, the pull rope component comprises a top portion 3-1-1 and a tail portion 3-1-2, the top portion 3-1-1 of the pull rope component is connected to a first reel 3-2-1, the tail portion 3-1-2 of the pull rope component is connected to a second reel 3-2-2, and the driving component comprises a first reel 3-2-1 connected to the top portion 3-1-1 of the pull rope component, a second reel 3-2-2 connected to the tail portion 3-1-2 of the pull rope component, and a driver member (not shown) for driving the first reel 3-2-1 or the second reel 3-2-2 to rotate.

It is not difficult to find from the above content that, the whole sweeping device is composed by the guide rail mechanism, the scraper mechanism 5, and the driving mechanism. Wherein, the upper rail 1-1 and the lower rail 1-2 in the guide rail mechanism are respectively disposed on an upper side and a lower side of the photovoltaic panel array, the driving mechanism is disposed on a back of the photovoltaic unit, and the driving mechanism comprises a pull rope component connected with the scraper mechanism 5 and a driving component connected with the pull rope component. In addition, the top portion 3-1-1 of the pull rope component is connected with the first reel 3-2-1 in the driving component and the tail portion 3-1-2 of the pull rope component is connected with the second reel 3-2-2 in the driving component. Thus, in practical applications, when the first reel 3-2-1 or the second reel 3-2-2 is driven by the driver member, the pull rope component can be made to drive the respective scraper mechanism 5 from an opposite direction to move on the guide rail mechanism, so that a direction switching operation is implemented when the scraper mechanism 5 cleans its corresponding photovoltaic panel array, sweeping on surface of the respective photovoltaic panel array is completed, and power generation efficiency of the whole photovoltaic unit is improved. Compared to the use of a robot, it only needs to install one scraper mechanism 5, then the photovoltaic panel arrays can be cleaned, structure is simplified, cost is reduced.

Specifically, in this example, in FIG. 6, the respective photovoltaic panel arrays in the photovoltaic unit as mentioned above may be set as N in this embodiment, and arranged in a straight line. And, in order to enable the scraper mechanism 5 to slide back and forth between the start position and the end position of its corresponding photovoltaic panel array, the driving mechanism is disposed on a back of the photovoltaic unit, and the driving mechanism comprises a pull rope component composed by a pull-up rope 3-1-3 and a pull-down rope 3-1-4 that pull the scraper mechanism 5 to slide on the guide rail mechanism. As shown in FIG. 6, the pull-up rope 3-1-3 is connected with the top portion of the scraper mechanism 5, the pull-down rope 3-1-4 is connected with the tail portion 3-1-2 of the scraper mechanism 5.

As can be known from the above content, since the pull-up rope 3-1-3 and the pull-down rope 3-1-4 are respectively connected with the top portion and the tail portion 3-1-2 of the scraper mechanism 5, the scraper mechanism 5 can follow a driving direction of the pull-up rope and the pull-down rope to slide toward a start position of its corresponding photovoltaic panel array when the driver member drives the first reel 3-2-1 to pull the top portions 3-1-1 of the pull-up rope 3-1-3 and the pull-down rope 3-1-4, also, the scraper mechanism 5 can follow a driving direction of the pull-up rope and the pull-down rope to slide toward an end position of its corresponding photovoltaic panel array when the driver member drives the first reel 3-2-2 to pull the tail portions 3-1-2 of the pull-up rope 3-1-3 and the pull-down rope 3-1-4, sliding of the scraper mechanism 5 on the guide rail mechanism is realized in this manner.

In addition, the driver member of the sweeping device in this example is located at a center position of the photovoltaic unit. Thus, better stability and reliability are achieved when the pull rope component drives the scraper mechanism 5 to slide along the guide rail mechanism.

Figure 7:
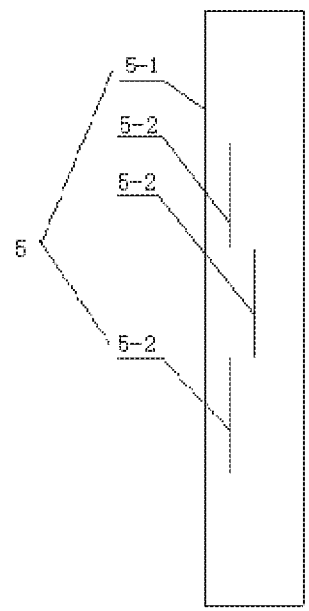
FIG. 7 is an installment diagram of blades on a crossbeam in the fourth example of some embodiments of the present invention.

In addition, for the sweeping device in this example to be capable of achieving better sweeping effect, in this example, as shown in FIG. 2, the scraper mechanism 5 may comprise a crossbeam 5-1 slidably connected with the upper rail 1-1 and the lower rail 1-2, and a plurality of blades 5-2 disposed on the crossbeam 5-1, in this example, the number of the blades 5-2 is set as 3, the blades are distributed on the crossbeam 5-1 in shape of a tripod, as shown in FIG. 7. Thus, as the crossbeam 5-1 on the scraper mechanism 5 is made to drive the respective blade 5-2 to clean the photovoltaic panel array under the action of the pull rope component, a longitudinal area of each photovoltaic panel 4-1 can be covered, so as to avoid a phenomenon of blind spots during sweeping, thereby better sweeping effect can be achieved. However, it should be noted that, the scraper mechanism 5 only comprises three blades 5-2 in this example, in practical application process, the number and distribution manner of the blades 5-2 may be appropriately increased or decreased based on area of the respective photovoltaic panel 4-1 in the photovoltaic panel array, and no specific limitation is made to the number of blades 5-2 in this example.

Figure 8:
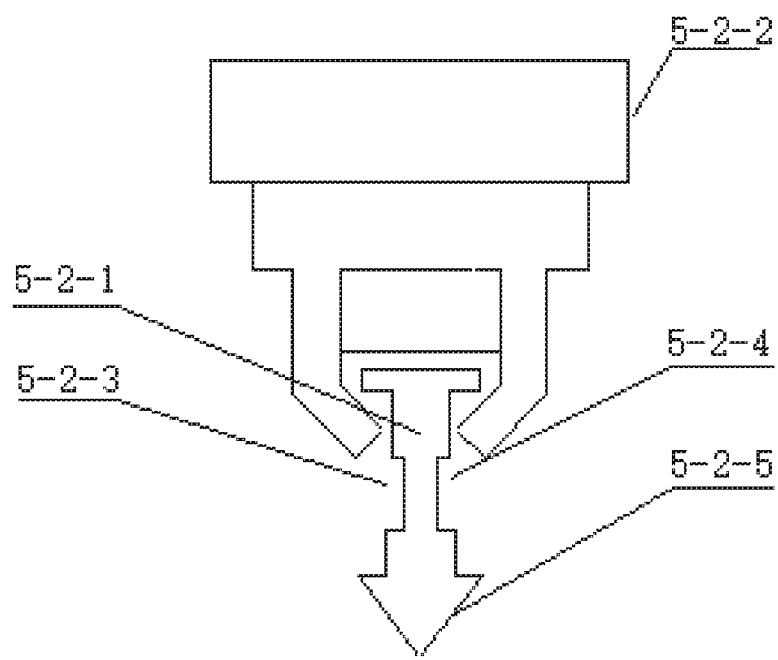
FIG. 8 is a schematic diagram of structure of blades in a fifth example of some embodiments of the present invention.

A fifth example relates to a sweeping device for the photovoltaic panel, the fifth example is a further improvement made based on the fourth example, its main improvement lies in: as shown in FIG. 8, in this example, the blade 5-2 may adopt the following structure, which comprises in specific: a blade body 5-2-1 and a blade holder 5-2-2 for fixing the blade body 5-2-1, and the blade body 5-2-1 is an elastic member.

It is not difficult to find from the above content that, the blade body 5-2-1 in this example is an elastic member, thereby it can be ensured that, when sweeping the photovoltaic panel array, the blade body 5-2-1 can be closely attached to an upper surface of each photovoltaic panel 4-1, so as to achieve good sweeping effect. In order to prevent the blade 5-2 from damaging the surface of the photovoltaic panel array 4 during the sweeping process, the blade holder 5-2-2 can be made of elastic materials such as rubber and silicone etc.

Figure 9:
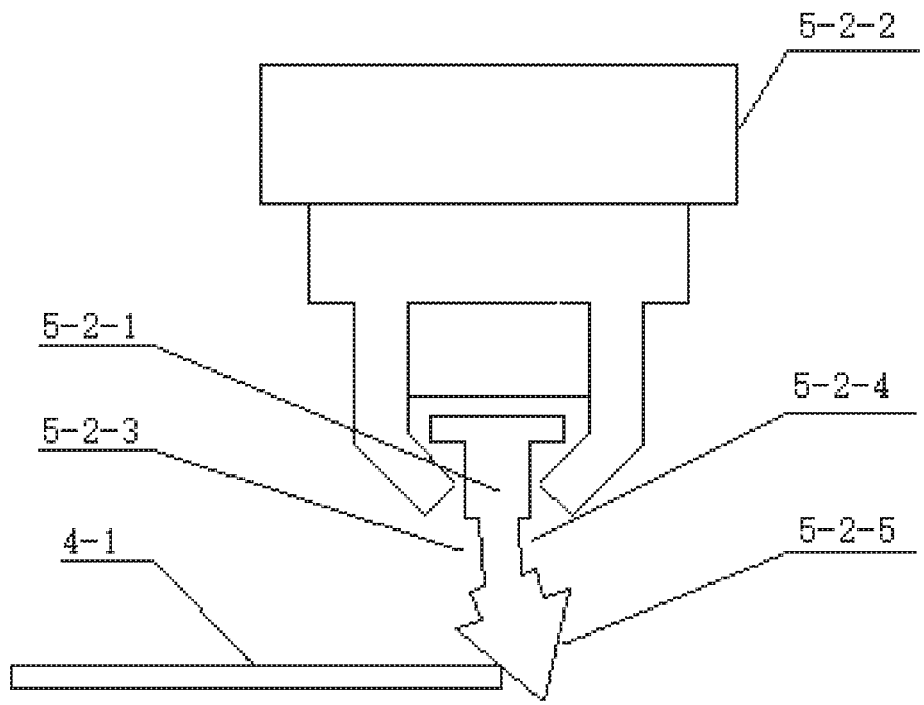
FIG. 9 is a schematic diagram of a state of blades when sweeping a photovoltaic panel in the fifth example of some embodiments of the present invention.

In addition, it is worth mentioning that, in this example, as shown in FIG. 9, the blade body 5-2-1 has a blade edge portion 5-2-5 that clings to the surface of the photovoltaic panel 4-1 and a left-turn groove 5-2-3 and a right-turn groove 5-2-4 that are opened on the blade edge portion 5-2-5. Thus, during the process of sweeping the photovoltaic panel 4-1, the blade body 5-2-1 can be bent closely against the surface of the photovoltaic panel 4-1 under the action of the left-turn groove 5-2-3 and the right-turn groove 5-2-4, and the blade body 5-2-1 can be prevented from damaging the surface of the photovoltaic panel array 4-1 during the sweeping process.

In addition, it should be noted that, when the blade body 5-2-1 is cross over the next photovoltaic panel 4-1, the blade edge portion 5-2-5 first abuts against an edge portion of the photovoltaic panel 4-1, and the blade body 5-2-1 is bent under the action of the left-turn groove and the right-turn groove, in a state shown in this figure, dirt on blade edge portion 5-2-5 of the blade body 5-2-1 is scraped off by a sharp part of the edge of the photovoltaic panel 4-1, so that self-sweeping effect is achieved after each sweeping of one photovoltaic panel 4-1.

Figure 10:
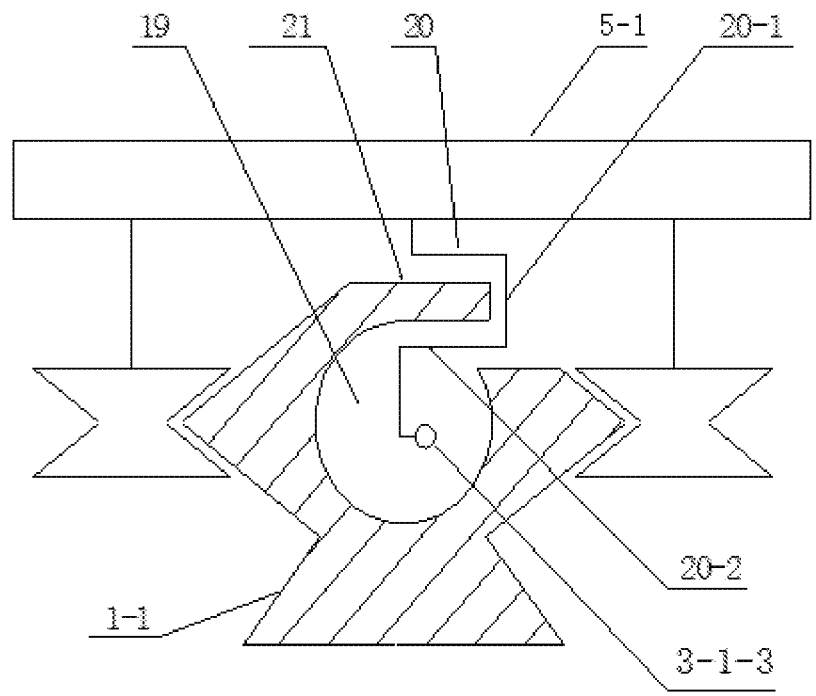
FIG. 10 is a schematic cross-sectional view of an upper rail in a sixth example of some embodiments of the present invention.

A sixth example relates to a sweeping device for the photovoltaic panel, the sixth example is roughly the same as the fifth example, the main difference lies in: as shown in FIG. 10, in this example, the upper rail 1-1 and the lower rail 1-2 have the same shape, and sectional shapes of the upper rail 1-1 and the lower rail 1-2 are a hollow structure with a notch, the hollow portion constitutes a cavity 19 of the upper rail 1-1 and the lower rail 1-2, and the guide above the notch forms a cap 21 for covering the cavity 19; wherein the pull-up rope 3-1-3 partially penetrates through the cavity 19 of the upper rail 1-1, and the pull-down rope 3-1-4 partially penetrates through the cavity 19 of the lower rail 1-2, and a bottom of a respective crossbeam 5-1 is respectively provided with an upper connecting plate 20 that is inserted into the notch of the upper rail 1-1 and a lower connecting plate that is inserted into the notch of the lower rail 1-2, and the upper and lower connecting plates on a respective crossbeam 5-1 are fixedly connected with the pull-up and pull-down ropes located in the cavity 19 of the upper rail 1-1 and the lower rail 1-2.

Specifically, as shown in FIG. 10, in this embodiment, a cross-sectional shape of the upper rail 1-1 and the lower rail 1-2 is a hollow structure with a notch, and the hollow portion constitutes the cavity 19 of the upper rail 1-1 and the lower rail 1-2, and the guide above the notch forms a cap 21 for covering the cavity 19.

Herein, since structures of the upper rail 1-1 and the lower rail 1-2 are the same, only the upper rail 1-1 will be described as an example in this embodiment. Specifically, the pull-up rope 3-1-3 may partially penetrate through the cavity 19 of the upper rail 1-1 when surrounding an upper rail roller set, and may be led out from the cavity 19 of the upper rail 1-1. The bottom of a respective crossbeam 5-1 is provided with an upper connecting plate 20 that is to be inserted into the notch of the upper rail 1-1, and the respective crossbeam 5-1 is fixedly connected with the pull-up rope 3-1-3 located in the cavity 19 of the upper rail 1-1 through the upper connecting plate 20, and the cap 21 is located on the cavity 19 for covering the cavity 19 and protecting the pull-up rope 3-1-3, so that the pull-up rope 3-1-3 can be prevented from being exposed externally when the pull-up rope 3-1-3 is driven inside the upper rail 1-1. In this way, the pull-up rope 3-1-3 can be prevented from being broken or damaged or the like due to icing or corrosion under extreme conditions.

In addition, for the respective crossbeam 5-1 to more smoothly slide on the guide rail mechanism, the upper connecting plate 20 comprises a vertical connecting portion 20-1 fixedly connected with the crossbeam 5-1, and a hook portion 20-2 inserted into the cavity 19 of the upper rail 1-1 from the notch of the upper rail 1-1 and fixedly connected with the pull-up rope in the cavity 19 of the upper rail 1-1; wherein the hook portion 20-2 of the upper connecting plate 20 is suspended in the cavity 19 of the upper rail 1-1. A lower connecting plate may adopt a structure the same as that of the upper connecting plate 20.

Thus it is not difficult to find that, during the process that the pull-up and pull-down ropes pull the crossbeam 5-1 to slide, because the upper and lower connecting plates are suspended in the cavity 19 of the respective guides, the hook portions 20-2 of the upper and lower connecting plates do not cause resistance to sliding of the crossbeams 5-1, which makes the crossbeams 5-1 slide smoother, and reduces the noise generated when the crossbeams 5-1 slide to a certain extent.

Figure 11:
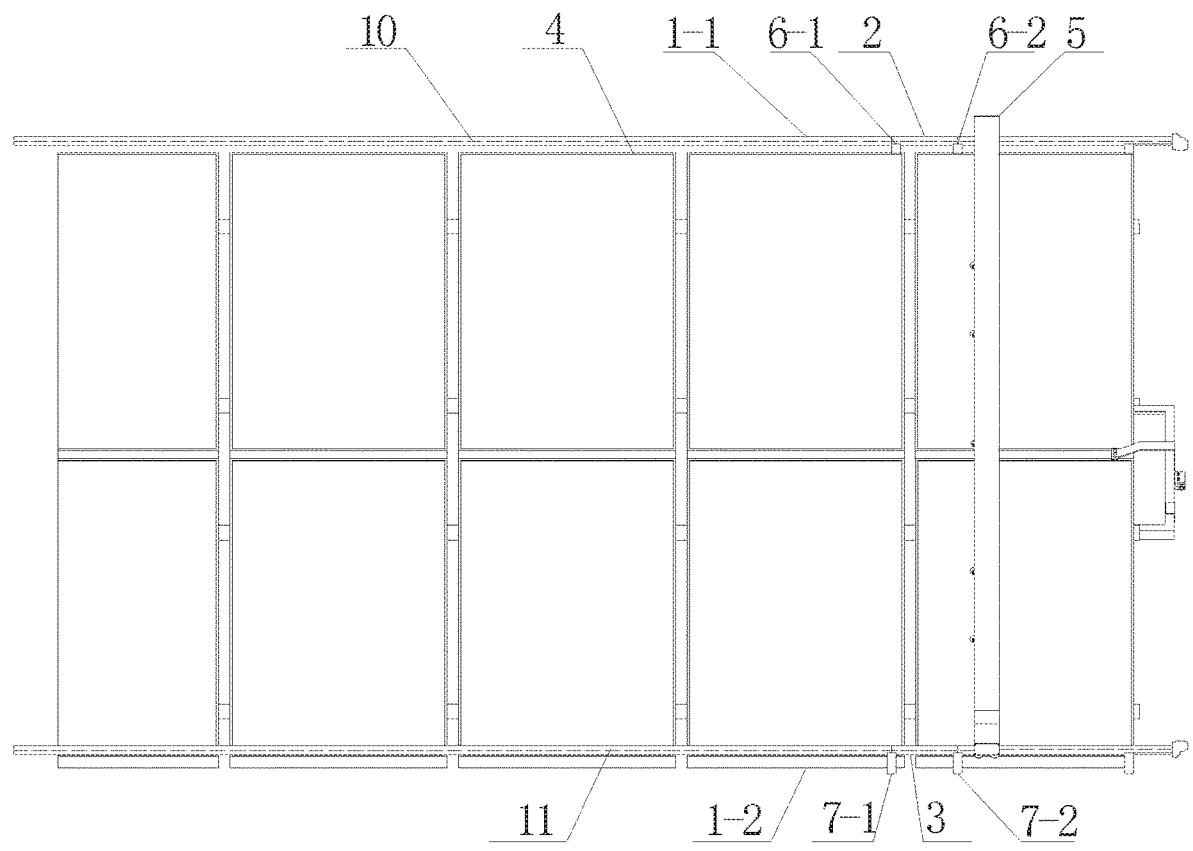
FIG. 11 is a schematic diagram of structure of a sweeping device for the photovoltaic panel according to a seventh example of some embodiments of the present invention.

A seventh example relates to a sweeping device for the photovoltaic panel, as shown in FIG. 11, the sweeping device is applied to a photovoltaic unit composed by a plurality of photovoltaic panel arrays 4 arranged in sequence, wherein an upper rail 1-1 and a lower rail 1-2 are respectively disposed on an upper side and a lower side of a respective photovoltaic panel array 4 to constitute a guide rail mechanism of the photovoltaic panel arrays 4, and a scraper mechanism 5 is respectively disposed on a respective guide rail mechanism.

Herein, as shown in FIG. 11, the sweeping device is further provided with a pull rope mechanism for pulling a respective scraper mechanism 5 to move in a longitudinal direction of the guide rail mechanism. The pull rope component comprises a pull-up rope 10 connected to a top portion of a respective scraper mechanism 5 and a pull-down rope 11 connected to a tail portion of a respective scraper mechanism 5, the pull-up rope 10 partially penetrates through the upper rail 1-1 of a respective guide rail mechanism, and the pull-down rope 11 partially penetrates through the lower rail 1-2 of a respective guide rail mechanism;

And it can be known by analyzing FIG. 11 that, a first detachable section 2 and a second detachable section 3 may be disposed respectively in the upper rail 1-1 and the lower rail 1-2 of the sweeping device, and used for connecting disconnected parts in the upper rail 1-1 and the lower rail 1-2. A position of the first detachable section 2 in the upper rail 1-1 is the same as a position of the second detachable section 3 in the lower rail 1-2. In addition, in order to simplify structures of the upper and lower rails, during design and applications, lengths of the first detachable section 2 and the second detachable section 3 may be set as the same, and the lengths of them are greater than a width of the scraper mechanism 5.

It is not difficult to find from the above content that, since the upper and the lower rails of the whole sweeping device have the first and second detachable sections respectively, and lengths of the first and second detachable sections are the same, an operator can conveniently remove the scraper mechanism 5 out of a removed part of the first and the second detachable sections and run an overhaul, and a damaged part of the pull-up and pull-down ropes can be exposed at the removed part through reel-in and reel-out movement of the pull-up rope or the pull-down rope. The damaged part of the pull-up and pull-down ropes can be cut off by the operator conveniently and reconnection can be made without removing the whole pull-up guide 1-1 or pull-down guide 1-2, thereby it facilitates maintenance of the scraper mechanism 5 and the pull-up and pull-down ropes by the operator, working efficiency is improved, and maintenance cost is reduced.

Specifically, as shown in FIG. 11, the respective photovoltaic panel arrays 4 in the photovoltaic unit as mentioned above may be set as 5 in total in this embodiment, and equally spaced in a manner of being arranged in a straight line. And, in order to enable the scraper mechanism 5 to move stably on the upper rail 1-1 and the lower rail 1-2, the sweeping device for the photovoltaic panel is provided with an upper locking assembly for locking and fixing the first detachable section 2 with two parts where the upper rail 1-1 is disconnected, and a lower locking assembly for locking and fixing the second detachable section 3 with two parts where the lower rail 1-2 is disconnected. Thus, during the process that the pull rope drives the scraper mechanism 5 to move on the upper rail 1-1 and the lower rail 1-2, the first detachable section 2 and the second detachable section 3 do not slip or loosen at disconnected parts of the upper rail 1-1 or the lower rail 1-2, which ensures a stable operation of the scraper mechanism 5.

Herein, as can be known from FIG. 11, the upper locking assembly in this example comprises a first upper fixing bracket 6-1 and a second upper fixing bracket 6-2 slidably disposed on two parts where the upper rail 1-1 is disconnected respectively, the lower locking assembly also has the same structure, and comprises in specific a first lower fixing bracket 7-1 and a second lower fixing bracket 7-2 slidably disposed on two parts where the lower rail 1-2 is disconnected respectively.

In addition, the first and second upper fixing brackets are further respectively provided with a first upper locking member (not shown) and a second upper locking member (not shown), and when the first upper fixing bracket 6-1 and the second upper fixing bracket 6-2 slide to a joint site of a disconnected part on the upper rail 1-1 corresponding thereto and the first detachable section 2, the first and second upper locking members lock and fix the joint site. Correspondingly, the first and second lower fixing brackets are further respectively provided with a first lower locking member (not shown) and a second lower locking member (not shown), and when the first lower fixing bracket 7-1 and the second lower fixing bracket 7-2 slide to a joint site of a disconnected part on the lower rail 1-2 corresponding thereto and the second detachable section 3, the first and second lower locking members lock and fix the joint site.

As can be known, the upper locking assembly and the lower locking assembly in this example have the same structure, so analysis and explanation are provided only for the lower locking assembly in specific.

As can be known from the above content, since the first lower fixing bracket 7-1 and the second lower fixing bracket 7-2 are slidably disposed on the lower rail 1-2, when the second detachable section 3 is connected with the two parts where the lower rail 1-2 is disconnected, the first lower fixing bracket and the second lower fixing bracket can be slide to a joint site of the two parts where the lower rail 1-2 corresponding thereto is disconnected and the second detachable section 3; and the first and second lower fixing brackets are respectively locked and fixed through the first and second lower locking members, so that the second detachable section 3 is fixedly connected to the two parts where the lower rail 1-2 is disconnected. When removing the second detachable section 3, it only needs to slide the first lower fixing bracket 7-1 and the second lower fixing bracket 7-2 respectively to the two parts where the lower rail 1-2 is disconnected after the first and second lower locking members are released. As such, a locking force for the second detachable section 3 and the two parts where the lower rail is disconnected can be cancelled, as shown in FIG. 12, so as to facilitate removal of the second detachable section 3 by the operator.

Figure 12:
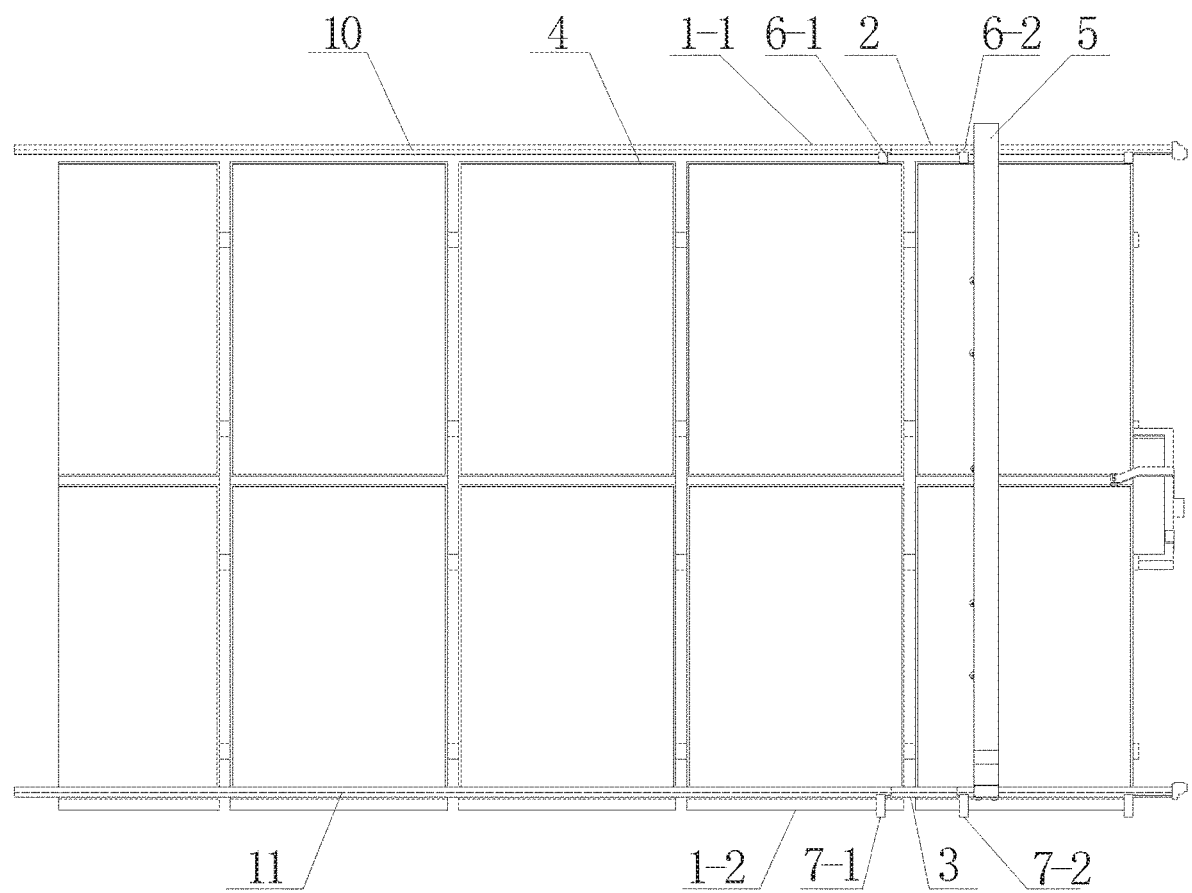
FIG. 12 is a schematic diagram of a state in which the upper and lower fixing brackets slide away from the removed part in the seventh example in some embodiments of the present invention.

In addition, as shown in FIGS. 11 and 12, as can be known from the above content, when removing the first detachable section 1, it only needs to slide the first upper fixing bracket 6-1 and the second upper fixing bracket 6-2 respectively to the two parts where the upper rail 1-2 is disconnected after the first and second upper locking members are released. As such, a locking force for the first detachable section 2 and the two parts where the upper rail 1-2 is disconnected can be cancelled to facilitate removal of the first detachable section 2 by the operator.

In practical applications, relative to the upper rail 1-1, the lower rail 1-2 is closer to the ground, and it is more convenient for the operator to remove the second detachable section 3, so the removal of the second detachable section 3 will be preferentially selected, in this embodiment, illustration is provided only for the process of connecting and disconnecting the second detachable section 3 and the two parts where the lower rail 1-2 is disconnected as an example.

Figure 13:
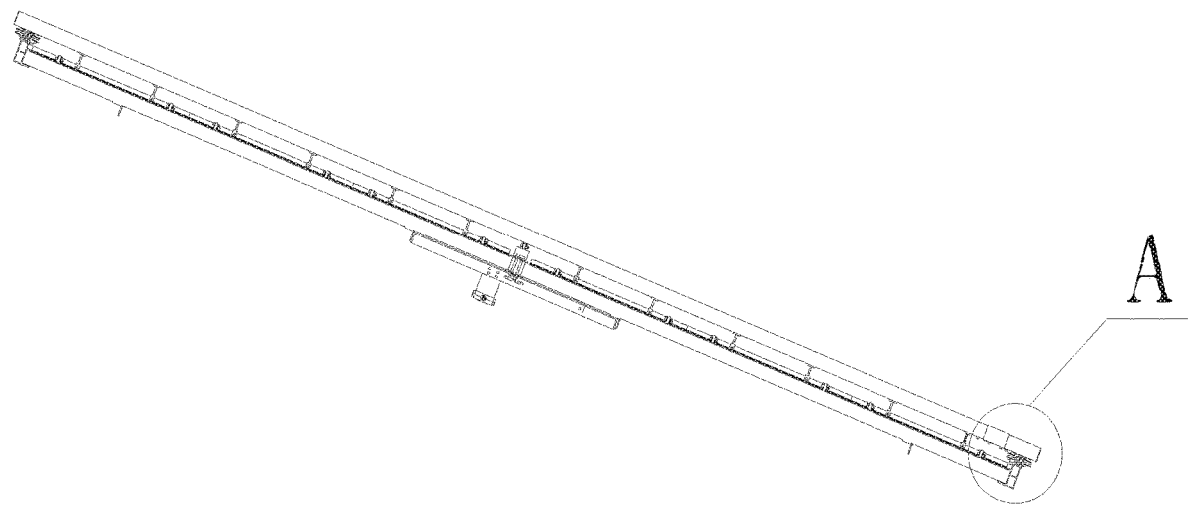
FIG. 13 is a schematic cross-sectional view when the scraper mechanism moves to the first and second detachable sections in the seventh example in some embodiments of the present invention.
Figure 14:
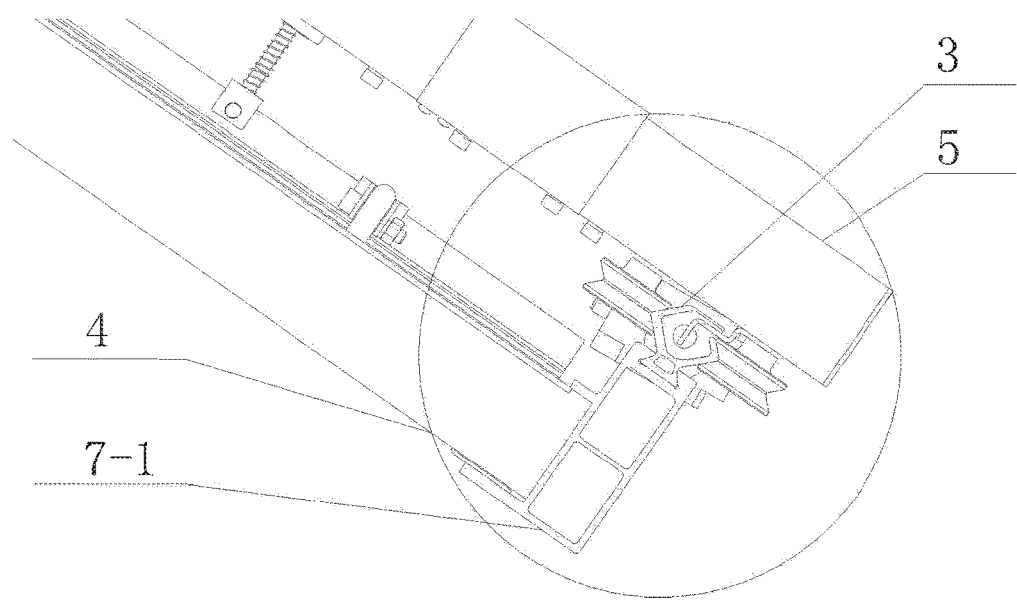
FIG. 14 is a schematic sectional view of the enlarged position A in FIG. 13.

Specifically, as shown in FIGS. 13 and 14, a lower rail groove (not shown) is set on the first lower fixing bracket and the second lower fixing bracket respectively, the second detachable section 3 and the two parts where the lower rail 1-2 is disconnected respectively have a lower insertion portion (not shown) for being inserted into the lower rail groove. Wherein, groove walls at two sides of the lower rail groove gradually gather from the bottom to the top toward the center of the lower rail groove, a cross-sectional shape of the lower insertion portion and a cross-sectional shape of the lower rail groove are the same, and after the lower insertion portion is inserted into the lower rail groove, the lower insertion portion is locked and fixed by means of that the lower insertion portion is undercut by the groove walls on the lower rail groove sides.

As can be known, because the first and second lower fixing brackets are respectively provided with lower rail grooves, the second detachable section 3 and the two parts where the lower rail 1-2 is disconnected respectively have a lower insertion portion for being inserted into the lower rail groove, and groove walls at two sides of the lower rail groove gradually gather from the bottom to the top toward the center of the lower rail groove, so that after the second detachable section 3 of the lower rail is inserted into the lower rail groove, and the second detachable section 3 and the lower insertion portion of the lower rail 1-2 can be locked and fixed through groove walls at two sides of the lower trail groove, so as to realize the installation between the second detachable section 3, the lower rail 1-2 and the first and second lower fixing brackets.

In addition, it needs to be noted that, in this example, an upper rail groove is set on the first upper fixing bracket 6-1 and the second upper fixing bracket 6-2 respectively, the first detachable section 2 and the two parts where the upper rail 1-1 is disconnected respectively have an upper insertion portion for being inserted into the upper rail groove. Groove walls at two sides of the upper rail groove gradually gather from the bottom to the top toward the center of the upper rail groove, a cross-sectional shape of the upper insertion portion and a cross-sectional shape of the upper rail groove are the same, and after the upper insertion portion is inserted into the upper rail groove, the upper insertion portion is locked and fixed by means of that the upper insertion portion is undercut by the groove wall on the upper rail groove sides. Since the upper rail groove also has the same structure as the lower rail groove, it will not be illustrated in detail in this example.

In addition, it is worth mentioning that, during an actual operation, when the operator installs and removes the second detachable section 3, correspondingly, the first detachable section 2 needs to be installed in the same way, thus it facilitates the scraper mechanism 5 being driven by the pull-up and pull-down ropes on the upper and lower rails, and the scraper mechanism 5 being removed from the guide rail mechanism. Thus, this embodiment only provides explanation for installing and removing the second detachable section 3.

Figure 15:
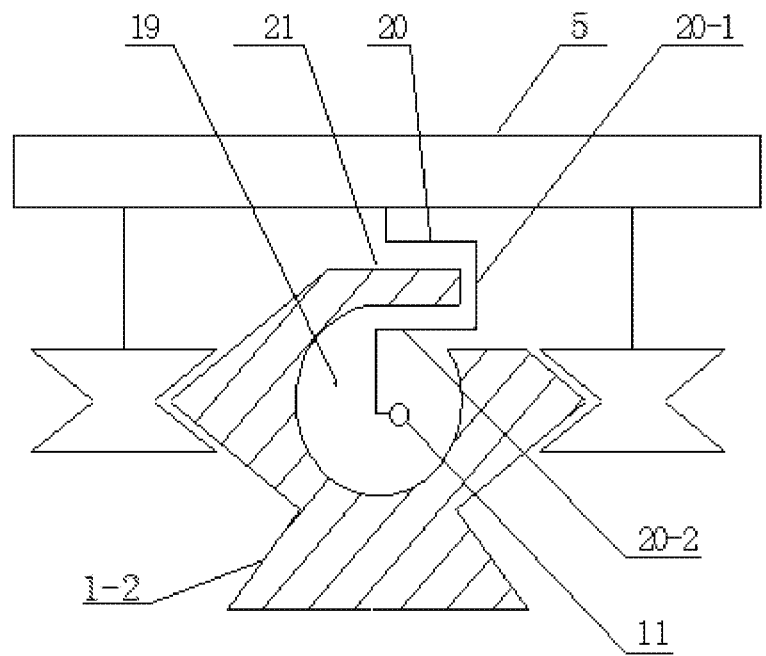
FIG. 15 is a cross-sectional view of a second detachable section in the seventh example of some embodiments of the present invention.

Specifically, before connecting the second detachable section 3 and the disconnected two parts of the lower rail 1-2, the operator needs to penetrate the pull-down rope 11 into the lower rail 1-2 and connect with the scraper mechanism 5, respectively. In addition, after the second detachable section 3 is fixed, in order to prevent a broken or damaged phenomenon when the pull-down rope 11 drives the scraper mechanism 5 to move on the lower rail 1-2 and the second detachable section 3, thus in this embodiment, the pull-down rope 11 can be led out from the second detachable section 3 and the lower rail 1-2, respectively. Thus, as shown in FIG. 15, in this embodiment, a cross-sectional shape of the second detachable section 3 is a hollow structure with a notch, and the hollow portion constitutes a cavity of the second detachable section 3, and the guide above the notch forms a cap 21 for covering the cavity.

In addition, in practical applications, since cross-section structures of the second detachable section 3 and the lower rail 1-2 are the same, only the second removable section 3 will be described as an example in this embodiment. Specifically, as shown in FIG. 15, the pull-down rope 11 may partially penetrate through the cavity 19 of the second detachable section 3 when connecting with the scraper mechanism 5, and may be led out from the cavity 19 of the second detachable section 3. The bottom of the scraper mechanism 5 is provided with an upper connecting plate 20 that is to be inserted into the notch of the lower rail 1-2, and the scraper mechanism 5 is fixedly connected with the pull-down rope 11 located in the cavity 19 of the second detachable section 3 through the upper connecting plate 20, and the cap 21 is located on the cavity 19 for covering the cavity 19 and protecting the pull-down rope 11, so that the pull-down rope 11 is prevented from being exposed externally when the pull-down rope 11 is performing reel-in or reel-out transfer movement within the lower rail 1-2. In this way, the pull-down rope 11 can be prevented from being broken or damaged or the like due to icing or corrosion under extreme conditions.

In addition, for the scraper mechanism 5 to more smoothly slide on the second detachable section 3, the upper connecting plate 20 comprises a vertical connecting portion 20-1 fixedly connected with the scraper mechanism 5, and a hook portion 20-2 inserted into the cavity 19 of the second detachable section 3 from the notch of the second detachable section 3 and fixedly connected with the pull-down rope 11 in the cavity 19 of the second detachable section 3; wherein the hook portion 20-2 of the upper connecting plate 20 is suspended in the cavity 19 of the second detachable section 3. A lower connecting plate may adopt a structure the same as that of the upper connecting plate 20.

Thus, after the pull-up and pull-down ropes are penetrated into the first removable section 2 and the second detachable section 3 and connected with the scraper mechanism 5, the pull-up and pull-down ropes can drive the scraper mechanism 5 to stably move on the first removable section 2 and the second removable section 3 and the two parts where the pull-up and pull-down guides are disconnected during the process of reel-in and reel out.

In addition, it needs to be noted that, in this example, a length of the first detachable section 2 is less than a length of each of the two parts where the upper rail 1-1 is disconnected, and a length of the second detachable section 3 is less than a length of each of the two sections where the lower rail 1-2 is disconnected. Thus, when the upper rail 1-1 or the lower rail 1-2 is reliably connected with the first detachable section 2 and the second detachable section 3, it can be also ensured that the upper rail 1-1 and the lower rail 1-2 have enough strength to withstand the weight of the photovoltaic panel array 4 and the impact generated when the scraper mechanism 5 moves on the upper rail 1-1 and the lower rail 1-2.

In addition, during the actual operation, after the pull-up and pull-down ropes are penetrated through the upper and lower rails, after the pull-down rope 11 is seated into the second detachable section 3, by means of sliding the first and second lower fixing brackets, the second detachable section 3 is inserted into the lower rail grooves on the first and second lower fixing brackets, thereafter the second detachable section 3 is locked and fixed respectively by the first and second lower locking members. Correspondingly, the operator can insert the first detachable section 2 into the groove of the upper rail 1-1 on the first and second upper fixing brackets in the same manner, and use the first upper locking member and the second upper locking member to lock and fix the first detachable section 2. It is worth mentioning that, in actual applications, a plurality of detachable sections may be set on the upper and lower rails according to actual needs, and no specific limitations or explanations are made in this example.

In addition, in this example, screw bolts are preferably used as the first and second upper locking members and the first and second lower locking members. Specifically, in the actual installment process, a joint site of the second detachable section 3 and the disconnected parts of the lower rail 1-2 may be respectively provided with corresponding screw holes, thus, when the first and second detachable sections are jointed with the corresponding upper and lower fixing brackets, and the corresponding disconnected parts of the upper and lower rails, the screw bolts and the screw holes can be screwed and connected to each other only by the aid of an external tool, so that the first and second detachable sections are fixed by the upper and lower locking members.

In addition, it should be noted that, in this example, the first and second upper locking members and the first and second lower locking members each comprise one screw bolt, and in practical applications, the number of screw bolts comprised in each locking member may also be multiple, and the respective locking members may also be selected from screw nut, screw nail, etc., no specific limitations or explanations are made in this embodiment.

Figure 16:
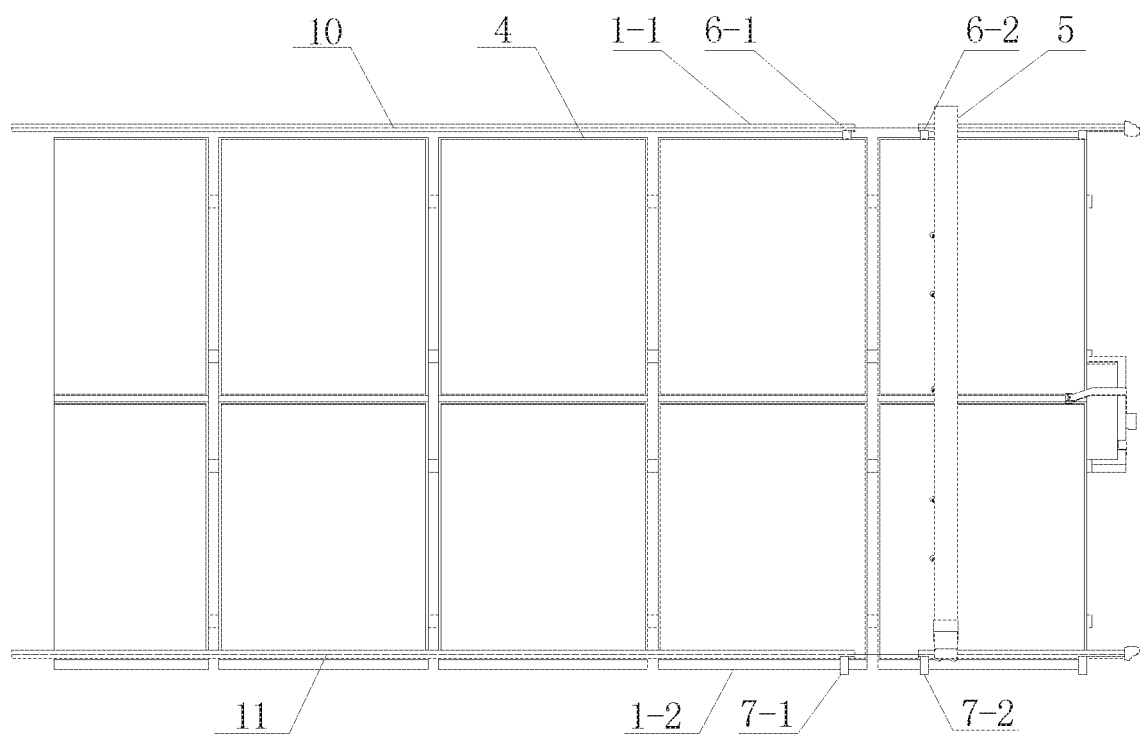
FIG. 16 is a schematic view of structure after the first and second detachable sections are removed in the seventh example of some embodiments of the present invention.
Figure 17:
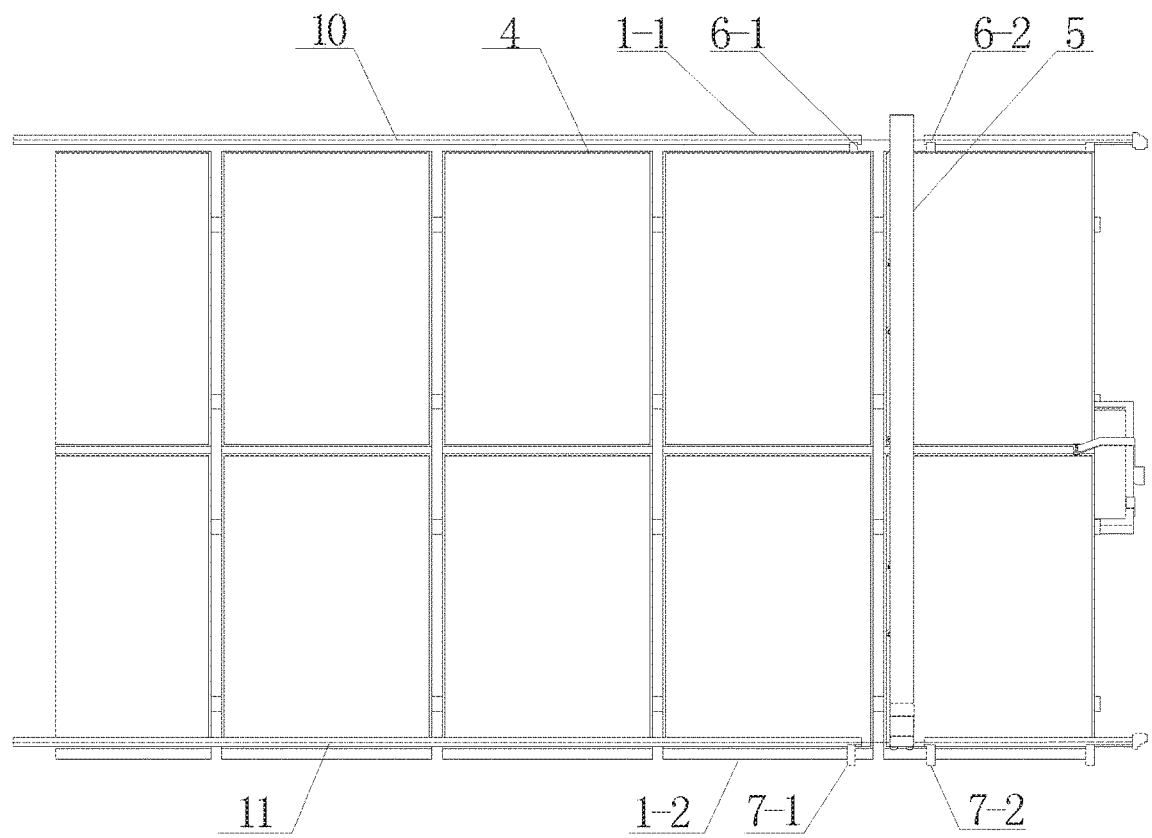
FIG. 17 is a schematic diagram of a state in which the scraper mechanism is pulled to a part where the second removable section is removed in the seventh example of some embodiments of the present invention.

As shown in FIG. 16, when the operator is inspecting the scraper mechanism 5 and the pull-up and pull-down ropes, the operator only needs to remove the first and second lower locking members by the aid of an external tool, and then slide the first and second lower fixing brackets through a simple manual operation, so that the second detachable section 3 can be removed from the lower rail 1-2, and ropes may be reel in or reel out, thus the pull ropes drive the scraper mechanism 5 to move to the position where the second detachable section 3 is removed, removal is then carried out for maintenance, as shown in FIG. 17, meanwhile, the operator may also run an overhaul for the pull-up and pull-down ropes at the removed part.

In addition, it is worth mentioning that, in order to meet installment requirements in practical applications and improve inspection efficiency, the first detachable section 2 may be disposed at any position of the upper rail 1-1, and the second detachable section 3 may also be disposed at any position of the lower rail 1-2, so that the operator can properly set the first detachable section 2 and the second detachable section 3 on the upper and lower rails according to an actual situation, and make the positions of the first detachable section 2 and the second detachable section 3 at the upper and lower rails corresponding to each other, thereby enabling the operator to remove the first detachable section 2 or the second detachable section from the upper rails 1-1 and the lower rail 1-2 at an easy-to-operate position, remove the scraper mechanism 5 from the upper rail 1-1 and the lower rail 1-2 by the aid of a corresponding tool for maintenance. Meanwhile, the operator can ensure that damaged parts of the pull-up and pull-down ropes can be exposed externally at the removed part through reel-in and reel-out of the ropes inside the upper and lower rails, so that the operator can timely detect hidden dangers in the pull-up and pull-down ropes to ensure a normal operation of the sweeping device for the photovoltaic panel.

Figure 18:
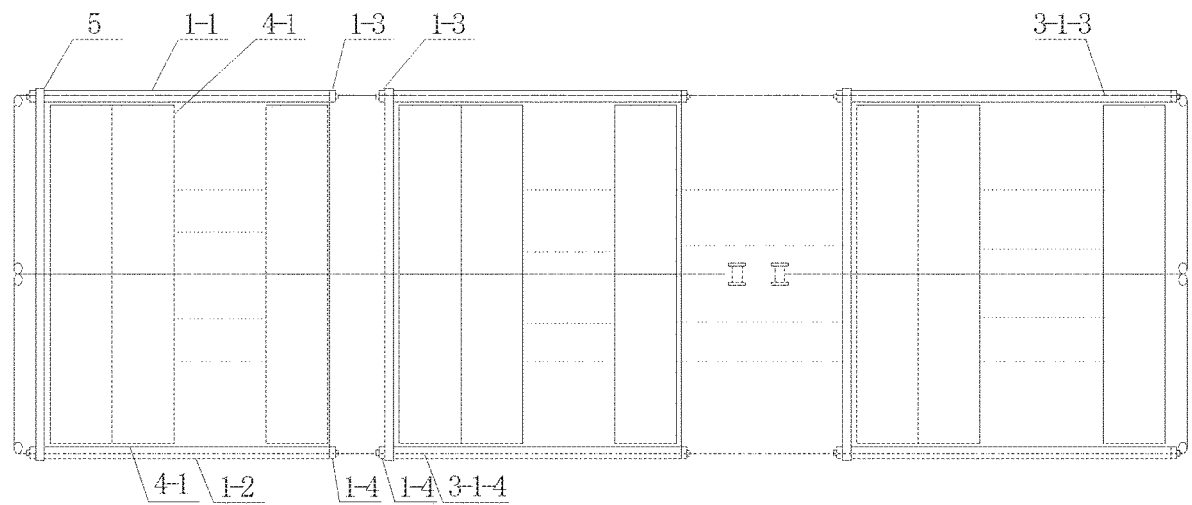
FIG. 18 is a schematic diagram of structure of a sweeping device for the photovoltaic panel according to an eighth seventh of some embodiments of the present invention.

An eighth example relates to a sweeping device for the photovoltaic panel, as shown in FIG. 18, the sweeping device is applied to a photovoltaic unit composed by a plurality of photovoltaic panel arrays arranged in sequence. In this embodiment, a plurality of photovoltaic panels 4-1 in each photovoltaic panel array are arranged in two columns in sequence, an upper column and a lower column, and the two columns of photovoltaic panels 4-1 are arranged symmetrically.

Figure 19:
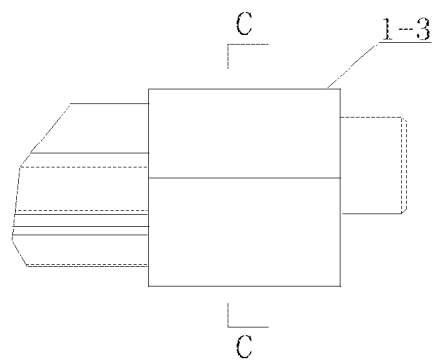
FIG. 19 is a schematic diagram of structure of an upper rail sleeve in the eighth example in some embodiments of the present invention.

In addition, as shown in FIG. 18, the sweeping device for the photovoltaic panel in this example further comprises a guide rail mechanism composed by an upper rail 1-1 and a lower rail 1-2, a scraper mechanism disposed on a respective guide rail mechanism, and a pull rope mechanism for driving a respective scraper mechanism to move along a longitudinal direction of the guide rail mechanism and a driving mechanism connected with the pull rope mechanism. And as shown in FIG. 18, the pull rope mechanism comprises a pull-up rope 3-1-3 connected to a top portion of a respective scraper mechanism and a pull-down rope 3-1-4 connected to a tail portion of a respective scraper mechanism, the pull-up rope 3-1-3 partially penetrates through the upper rail 1-1 of a respective guide rail mechanism, and the pull-down rope 3-1-4 partially penetrates through the lower rail 1-2 of a respective guide rail mechanism In addition, as shown in FIGS. 18 and 19, opposite ends of the upper rails 1-1 of every two adjacent guide rail mechanisms are respectively provided with an upper rail sleeve 1-3 for guiding the pull-up rope 3-1-3, and opposite ends of the lower rails 1-2 of every two adjacent guide rail mechanisms are respectively provided with a lower rail sleeve 1-4 for guiding the pull-down rope 3-1-4. Herein, it needs to be noted that, the upper and lower rail sleeves have the same structure, and each have a rolling component (not shown) that resists their corresponding pull rope in interior respectively.

It is not difficult to find from the above content that, in the whole sweeping device, opposite ends of the upper rail 1-1 and lower rail 1-2 of every two adjacent guide rail mechanisms are respectively provided with an upper rail sleeve 1-3 and a lower rail sleeve 1-4 for guiding the pull-up rope 3-1-3 and the pull-down rope 3-1-4, respectively; and the upper rail sleeve and the lower rail sleeve are of the same structures, and each have a rolling component that resists its corresponding pull rope in interior. Thus, in practical applications, when the rolling components in the upper and lower rail sleeves enable the pull rope to drive the scraper mechanism 5 to perform sweeping movement on the photovoltaic panel 4-1, contact between the pull rope and the guide rail mechanism can be avoided, not only wearing caused by the pull rope drives the scraper mechanism 5 to move can be reduced, but also it facilitates maintenance of the sweeping device. Maintenance cost of the sweeping device is reduced, and structure of the whole sweeping device is also simplified.

Figure 20:
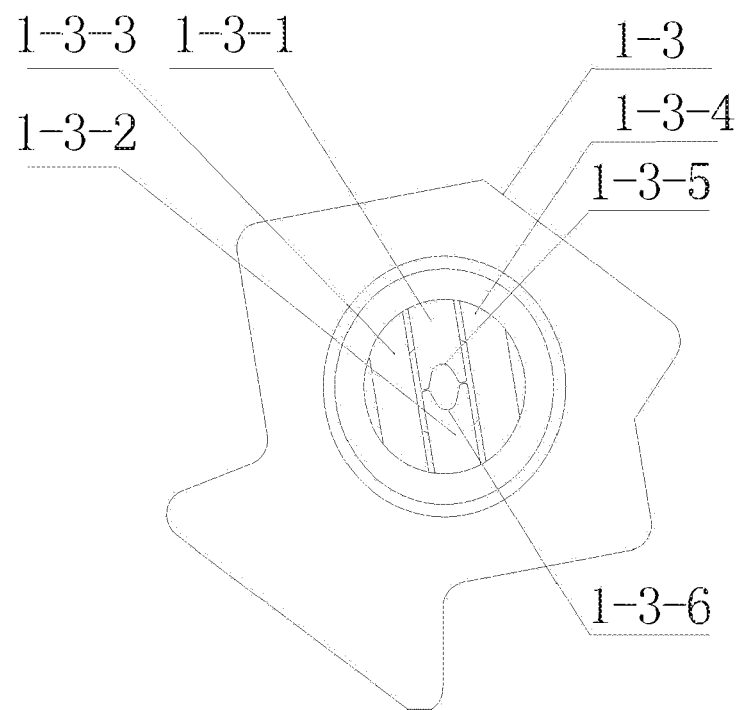
FIG. 20 is a side view of FIG. 19.
Figure 21:
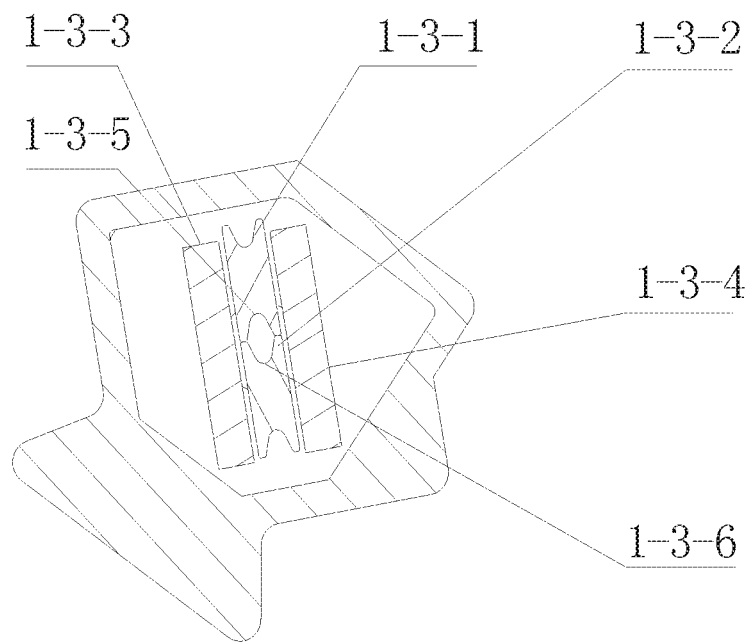
FIG. 21 is a sectional view at C-C in FIG. 19.

Specifically, in an example, the rolling component mentioned in the above, as shown in FIGS. 20 and 21, comprises a first roller 1-3-1, a second roller 1-3-2 symmetrically arranged with respect to the first roller 1-3-1, as well as a first rotor shaft (not shown) for fixing the first roller 1-3-1, a second rotor shaft (not shown) for fixing the second roller 1-3-2; wherein an inner concave portion where the pull-up rope 3-1-3 or the pull-down rope 3-1-4 can be embedded is formed on a circumferential surface of the first roller 1-3-1 and the second roller 1-3-2, and a position where the inner concave portion 1-3-5 of the first roller 1-3-1 and the inner concave portion 1-3-6 of the second roller 1-3-2 fit constitutes a pull rope accommodation area that can be penetrated by the pull-up rope 3-1-3 or the pull-down rope 3-1-4.

Thus it is not difficult to find that, in practical applications, after the pull rope and the pull-down rope are penetrated through the pull rope accommodation area, when the pull-up rope and the pull-down rope drive the scraper mechanism 5 to move along the upper rail and the lower rail, under the action of the first roller 1-3-1 and the second roller 1-3-2, it is possible that the pull-up rope and the pull-down rope pass through the guide rail mechanism without contacting an inner surface of the upper rail and the lower rail, and because the inner concave portion that constitutes the pull rope accommodation area is a circumferential surface, contact area between the first roller 1-3-1 and the second roller 1-3-2 can be reduced, and further frictional resistance to the pull-up and pull-down ropes can be reduced, thereby wearing of the pull-up and pull-down ropes can be reduced.

In addition, a width of the inner concave portion 1-3-5 of the first roller 1-3-1 and the inner concave portion 1-3-6 of the second roller is greater than a sectional diameter of the pull-up and pull-down ropes, and a depth of the inner concave portion 1-3-5 of the first roller 1-3-1 and the inner concave portion 1-3-6 of the second roller is greater than a sectional radius of the pull-up rope and the pull-down rope 3-1-4. Thus, during installment of the sweeping device by the operator, the pull-up rope and the pull-down rope can be accommodated by the inner concave portion 1-3-5 of the first roller 1-3-1 and the inner concave portion 1-3-6 of the second roller 1-3-2.

In addition, in this example, the first roller 1-3-1 and the second roller 1-3-2 may be butted against each other, so that the pull rope accommodation area is a closed annular area.

Thus it is not difficult to find that, when the first roller 1-3-1 and the second roller 1-3-2 are butted against each other, the pull rope accommodation area is a closed annular area, during the process that the pull-up rope and the pull-down rope drive the scraper mechanism to move, the pull-up rope and the pull-down rope are always in a closed annular area constituted by the inner concave portion 1-3-5 of the first roller 1-3-1 and the inner concave portion 1-3-6 of the second roller 1-3-2.

In addition, in practical applications, in order to further fix the first roller 1-3-1 and the second roller 1-3-2 and keep the pull-up rope and the pull-down rope always in the pull rope accommodation area, the rolling component in this embodiment further comprises a first baffle plate 1-3-3 and a second baffle plate 1-3-4 symmetrically disposed on two sides of the first roller 1-3-1 and the second roller 1-3-2, and the first baffle plate 1-3-3 and the second baffle plate 1-3-4 completely block at least the site where the first roller 1-3-1 and the second roller 1-3-2 fit. Thus, during the process of driving the scraper mechanism 5 by the pull-up rope and the pull-down rope, the first baffle plate 1-3-3 and the second baffle plate 1-3-4 can play the role of limiting the pull-up rope and pull-down rope, so that the pull-up rope and the pull-down rope are always located on the site where the first roller 1-3-1 and the second roller 1-3-2 fit.

Figure 22:
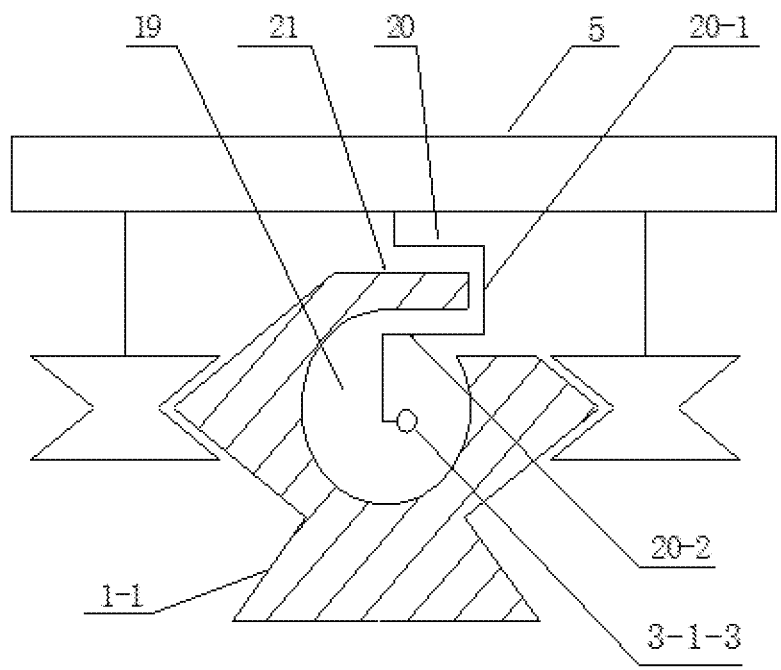
FIG. 22 is a cross-sectional view of an upper rail in the eighth example of some embodiments of the present invention.

In addition, it worth mentioning that, as shown in FIG. 22, in order to prevent a broken or damaged phenomenon from occurring during driving of the pull-up rope 3-1-3 and the pull-down rope 3-1-4, in this embodiment, the pull-up rope 3-1-3 and the pull-down rope 3-1-4 can be led out from the upper rail 1-1 and the lower rail 1-2, respectively. The upper rail 1-1 and the lower rail 1-2 have the same shape, and sectional shapes of the upper rail 1-1 and the lower rail 1-2 are a hollow structure with a notch, the hollow portion constitutes a cavity 19 of the upper rail 1-1 and the lower rail 1-2, and the guide above the notch forms a cap 21 for covering the cavity 19; wherein the pull-up rope 3-1-3 partially penetrates through the cavity 19 of the upper rail 1-1, the pull-down rope 3-1-4 partially penetrates through the cavity 19 of the lower rail 1-2, and a bottom of the scraper mechanism 5 is respectively provided with an upper connecting plate 20 that is inserted into the notch of the upper rail 1-1 and a lower connecting plate that is inserted into the notch of the lower rail 1-2, and the upper and lower connecting plates on a respective scraper mechanism 5 are fixedly connected with the pull-up rope and the pull-down rope located in the cavity 19 of the upper rail 1-1 and the lower rail 1-2.

Specifically, as shown in FIG. 22, in this embodiment, a cross-sectional shape of the upper rail 1-1 and the lower rail 1-2 is a hollow structure with a notch, and the hollow portion constitutes the cavity 19 of the upper rail 1-1 and the lower rail 1-2, and the guide above the notch forms a cap 21 for covering the cavity 19.

Herein, since structures of the upper rail 1-1 and the lower rail 1-2 are the same, only the upper rail 1-1 will be described as an example in this embodiment. Specifically, the pull-up rope 3-1-3 may partially penetrate through the cavity 19 of the upper rail 1-1 when surrounding an upper rail roller set, and may be led out from the cavity 19 of the upper rail 1-1. The bottom of a respective scraper mechanism 5 is provided with an upper connecting plate 20 that is to be inserted into the notch of the upper rail 1-1, and the respective scraper mechanism 5 is fixedly connected with the pull-up rope 3-1-3 located in the cavity 19 of the upper rail 1-1 through the upper connecting plate 20, and the cap 21 is located on the cavity 19 for covering the cavity 19 and protecting the pull-up rope 3-1-3, so that the pull-up rope 3-1-3 can be prevented from being exposed externally when the pull-up rope 3-1-3 is driven inside the upper rail 1-1. In this way, the pull-up rope 3-1-3 can be prevented from being broken or damaged or the like due to icing or corrosion under extreme conditions.

In addition, for the respective scraper mechanism 5 to more smoothly slide on the guide rail mechanism, the upper connecting plate 20 comprises a vertical connecting portion 20-1 fixedly connected with the scraper mechanism 5, and a hook portion 20-2 penetrated into the cavity 19 of the upper rail 1-1 from the notch of the upper rail 1-1 and fixedly connected with the pull-up rope 3-1-3 in the cavity 19 of the upper rail 1-1; wherein the hook portion 20-2 of the upper connecting plate 20 is suspended in the cavity 19 of the upper rail 1-1. Thus, a lower connecting plate may adopt a structure the same as that of the upper connecting plate 20.

Thus it is not difficult to find that, during the process that the pull-up and pull-down ropes pull the scraper mechanism 5 to slide, because the upper and lower connecting plates are suspended in the cavity 19 of the respective guides, the hook portions 20-2 of the upper and lower connecting plates do not cause resistance to sliding of the scraper mechanism 5, which makes the scraper mechanism 5 slide smoother, and reduces the noise generated when the scraper mechanism 5 slides to a certain extent.

A ninth example relates to a sweeping device for the photovoltaic panel, the ninth example is roughly the same as the eighth example, its improvement lies in: in this embodiment, the upper rail sleeve 1-3 is detachably connected with the upper rail 1-1, and the lower rail sleeve 1-4 is detachably connected with the lower rail 1-2.

It is not difficult to find from the above content that, because the upper rail sleeve 1-3 and the lower rail sleeve 1-4 may be detachably connected with the upper and lower rails, so that when the operator can install the upper and lower rail sleeves according to actual needs, and during the installation and disassembling process, the operator can inspect and repair the pull-up rope 3-1-3 and the pull-down rope 3-1-4 more conveniently, and after damage is caused by a long time contact between ends of each guide rail mechanism and the pull-up rope 3-1-3 or the pull-down rope 3-1-4, a damaged segment of the upper rail 1-1 or the lower rail 1-2 can be replaced without disassembling the whole upper rail 1-1 or the whole lower rail 1-2.

In addition, in order to facilitate installation and replacement of the upper rail sleeve 1-3 and the lower rail sleeve 1-4 in practical applications, specifically, in this embodiment, the upper rail sleeve 1-3 has an inner cavity (not shown) to be inserted by the upper rail, and a shape of the inner cavity of the upper rail sleeve 1-3 is the same as an outer shape of the upper rail 1-1, and after the upper rail 1-1 is inserted into the inner cavity of the upper rail sleeve 1-3, the upper rail sleeve 1-3 is locked together with the upper rail 1-1 by bolts (not shown). The lower rail sleeve 1-4 has an inner cavity (not shown) for to be inserted into the lower rail 1-2, and a shape of the inner cavity of the lower rail sleeve 1-4 is the same as an outer shape of the lower rail 1-2, after the lower rail 1-2 is inserted into the inner cavity of the lower rail sleeve 1-4, the lower rail sleeve 1-4 is locked together with the lower rail 1-2 by bolts (not shown), thereby facilitating installment between the upper and lower rail sleeves and the upper and lower rails.

Figure 23:
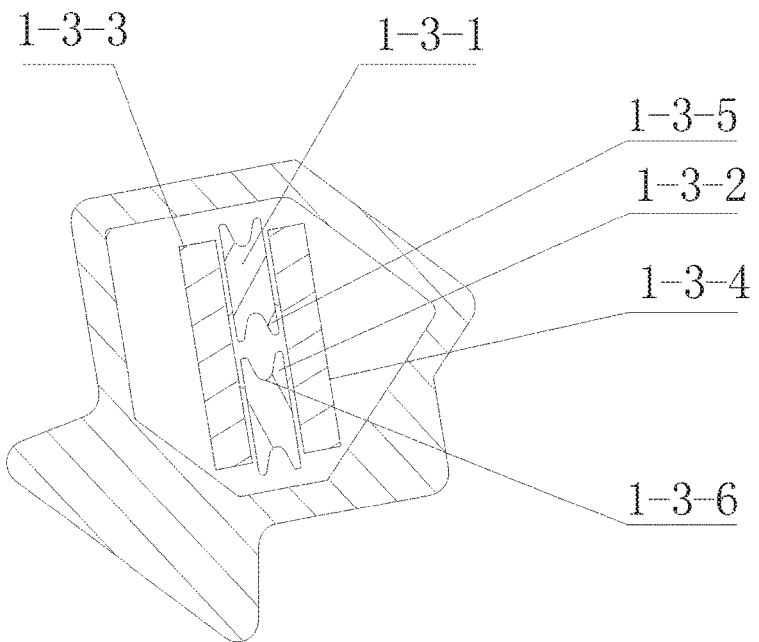
FIG. 23 is a schematic diagram of a state in which two rollers are separated in a tenth example in some embodiments of the present invention.

A tenth example relates to a sweeping device for the photovoltaic panel, the tenth example is roughly the same as the ninth example, the main difference lies in: in this example, as shown in FIG. 23, the first roller 1-3-1 and the second roller 1-3-2 are spaced apart from each other, and the first roller 1-3-1 and the second roller 1-3-2 are spaced by a distance smaller than the cross-sectional diameter of the pull-up and pull-down ropes.

It is not difficult to find from the above content that, the first roller 1-3-1 and the second roller 1-3-2 are spaced apart from each other, and the first roller 1-3-1 and the second roller 1-3-2 are spaced by a distance smaller than the cross-sectional diameter of the pull-up and pull-down ropes, thus the operator can select the corresponding pull rope according to an actual situation, and then set a distance by which the first roller 1-3-1 and the second roller 1-3-2 are spaced from each other according to the diameter of the pull rope, so that during the process that the pull-up and pull-down ropes drive the scraper mechanism 5 to move, the first roller 1-3-1 and the second roller 1-3-2 are always located in positions where the first roller 1-3-1 and the second roller 1-3-2 fit, frictional resistance to the pull-up rope 3-1-3 and the pull-down rope 3-1-4 during the driving can be reduced, thereby wearing of the pull-up and pull-down ropes can be reduced.

Figure 24:
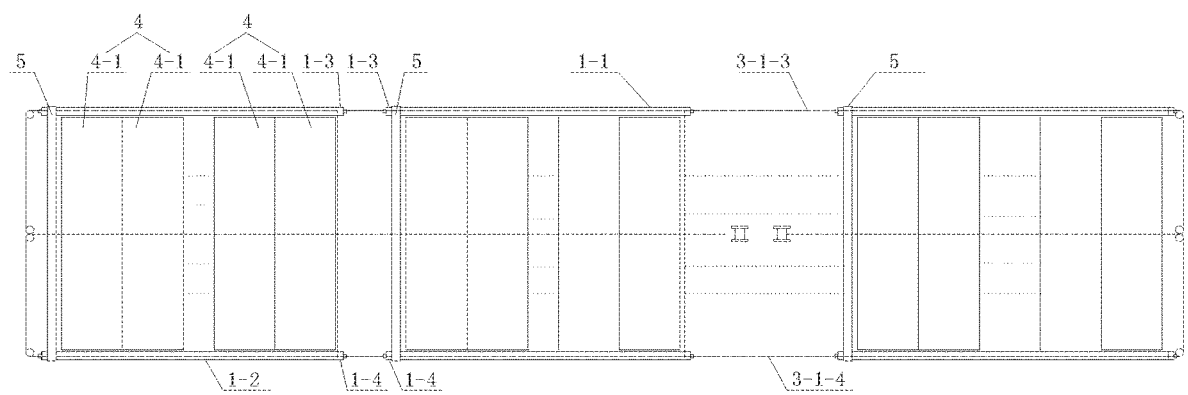
FIG. 24 is a schematic diagram of structure of a sweeping device for the photovoltaic panel according to an eleventh example of some embodiments of the present invention.

An eleventh example relates to a sweeping device for the photovoltaic panel, the eleventh example is roughly the same as the first or second example, the main difference lies in: in this example, as shown in FIG. 24, M is a natural number greater than one, and N is an even multiple of M, and each scraper mechanism 5 corresponds one-by-one to the photovoltaic panel array 4 whose number is consistent with that of the scraper mechanism as an even multiple account. In other words, in this embodiment, the scraper mechanism 5 is set as multiple, and each scraper mechanism 5 always corresponds to the photovoltaic panel array 4 whose amount is an even number. In this way, it enables the sweeping device in this embodiment to meet more complex topography situations and application scenarios.

In addition, in order to ensure that the pull-up rope 3-1-3 and the pull-down rope 3-1-4 of the pull rope mechanism do not directly contact with the guide during driving while realizing synchronous operation of the respective scraper mechanisms 5, and avoid wearing of the pull-up and pull-down ropes, the guide rail mechanism corresponding to each photovoltaic array adopt detachable straight line guides (not shown) mutually linked, and every two adjacent photovoltaic arrays adopt the technical solution as described in the eighth embodiment.

Specifically, as shown in FIG. 24, opposite ends of the upper rails 1-1 of two adjacent guide rail mechanisms of every two adjacent photovoltaic arrays are respectively provided with an upper rail sleeve 1-3 for guiding the pull-up rope 3-1-3, opposite ends of the lower rails 1-2 of two adjacent guide rail mechanisms of every two adjacent photovoltaic arrays are respectively provided with a lower rail sleeve 1-4 for guiding the pull-up rope 3-1-4, interiors of the upper and lower rail sleeves also have a rolling component (not shown) for resisting each corresponding pull rope, and the upper and pull-down ropes are butted by the rolling component.

Also, it should be noted that, the upper rail sleeve 1-3, the lower rail sleeve 1-4 and the rolling component provided in the upper and lower rail sleeves mentioned in this example are the same as those in the eighth embodiment. Thus, no details will be described in this embodiment.

According to some embodiments of the present invention, the following examples are provided.

Item 1. A sweeping device for the photovoltaic panel applied to a photovoltaic unit composed by N photovoltaic panel arrays arranged in sequence, N being a natural number greater than one, the sweeping device comprising:

a guide rail mechanism composed by an upper rail and a lower rail respectively disposed on an upper side and a lower side of a respective photovoltaic panel array; and a scraper mechanism distributed on the guide rail mechanism, each photovoltaic panel array corresponding to one scraper mechanism;

wherein each photovoltaic panel array is composed by M photovoltaic panels arranged one above the other in sequence, M being an even number greater than two;

the sweeping device further comprises:

a driving mechanism for driving a respective scraper mechanism to move along a longitudinal direction of the guide rail mechanism, wherein the driving mechanism is disposed on a back of the photovoltaic unit, and the driving mechanism comprises a pull rope component connected with a respective scraper mechanism, the pull rope component comprises a top portion and a tail portion; and a driving component connected with the pull rope component, the driving component comprises a first reel connected to the top portion of the pull rope component, a second reel connected to the tail portion of the pull rope component, and a driver member for driving the first reel or the second reel to rotate.

Item 2. The sweeping device for the photovoltaic panel according to Item 1, wherein the pull rope component comprises a pull-up rope connected to a top portion of a respective scraper mechanism and a pull-down rope connected to a tail portion of a respective scraper mechanism.

Item 3. The sweeping device for the photovoltaic panel according to Item 1 or 2, wherein the driver member is located at a center position of the photovoltaic unit.

Item 4. The sweeping device for the photovoltaic panel according to Item 1, 2 or 3, wherein the scraper mechanism comprises a crossbeam slidably connected with the upper rail and the lower rail and L blades disposed on the crossbeam, L being a natural number.

Item 5. The sweeping device for the photovoltaic panel according to Item 4, wherein L is 3 and the blades are distributed on the crossbeam in shape of a tripod.

Item 6. The sweeping device for the photovoltaic panel according to Item 5, wherein the blade comprises a blade body and a blade holder for fixing the blade body, and the blade body is an elastic member.

Item 7. The sweeping device for the photovoltaic panel according to Item 6, wherein the blade body has a blade edge portion that clings to the surface of the photovoltaic panel and a left-turn groove and a right-turn groove that are opened above the blade edge portion.

Item 8. The sweeping device for the photovoltaic panel according to any of Items 4 to 7, wherein the upper rail and the lower rail have the same shape, and sectional shapes of the upper rail and the lower rail are a hollow structure with a notch, the hollow portion constitutes the cavity of the upper rail and the lower rail, and the guide above the notch forms a cap for covering the cavity;

wherein the pull-up rope partially penetrates through the cavity of the upper rail, and the pull-down rope partially penetrates through the cavity of the lower rail, and a bottom of a respective crossbeam is provided with an upper connecting plate that is inserted into the notch of the upper rail and a lower connecting plate that is inserted into the notch of the lower rail respectively, and the upper and lower connecting plates on a respective crossbeam are fixedly connected with the pull-up and pull-down ropes located in the cavity of the upper rail and the lower rail.

Item 9. The sweeping device for the photovoltaic panel according to Item 8, wherein the upper and lower connecting plates each comprise a vertical connecting portion fixedly connected with the crossbeam;

the upper connecting plate and the lower connecting plate each further comprise a hook portion inserted into a guide cavity from a guide notch and fixedly connected with the pull rope in the guide cavity corresponding thereto;

wherein the hook portions of the upper and lower connecting plates are respectively suspended in the cavity of the upper rail and the lower rail.

Item 10. A sweeping device for the photovoltaic panel applied to a photovoltaic unit composed by N photovoltaic panel arrays arranged in sequence, N being a natural number greater than one, the sweeping device comprising:

a guide rail mechanism composed by an upper rail and a lower rail respectively disposed on an upper side and a lower side of a respective photovoltaic panel array; and a scraper mechanism slidably distributed on the guide rail mechanism, the scraper mechanism being one in terms of number; wherein each photovoltaic panel array is composed by M photovoltaic panels arranged one above the other in sequence, M being an even number greater than two;

the sweeping device further comprises a driving mechanism for driving the scraper mechanism to move along a longitudinal direction of the guide rail mechanism, wherein the driving mechanism is disposed on a back of the photovoltaic unit, and the driving mechanism comprises:

a pull rope component connected with the scraper mechanism, the pull rope component comprises a top portion and a tail portion; and a driving component connected with the pull rope component, the driving component comprises a first reel connected to the top portion of the pull rope component, a second reel connected to the tail portion of the pull rope component, and a driver member for driving the first reel or the second reel to rotate.

Item 11. The sweeping device for the photovoltaic panel according to Item 10, wherein the pull rope component comprises a pull-up rope connected to a top portion of the scraper mechanism and a pull-down rope connected to a tail portion of the scraper mechanism.

Item 12. The sweeping device for the photovoltaic panel according to Item 10 or 11, wherein the driver member is located at a center position of the photovoltaic unit.

Item 13. The sweeping device for the photovoltaic panel according to Item 10, 11 or 12, wherein the scraper mechanism comprises a crossbeam slidably connected with the upper rail and the lower rail and L blades disposed on the crossbeam, L being a natural number.

Item 14. The sweeping device for the photovoltaic panel according to Item 13, wherein L is 3 and the blades are distributed on the crossbeam in shape of a tripod.

Item 15. The sweeping device for the photovoltaic panel according to Item 13 or 14, wherein the blade comprises a blade body and a blade holder for fixing the blade body, and the blade body is an elastic member.

Item 16. The sweeping device for the photovoltaic panel according to Item 15, wherein the blade body has a blade edge portion that clings to the surface of the photovoltaic panel and a left-turn groove and a right-turn groove that are opened above the blade edge portion.

Item 17. The sweeping device for the photovoltaic panel according to any of Items 13 to 16, wherein the upper rail and the lower rail have the same shape, and sectional shapes of the upper rail and the lower rail are a hollow structure with a notch, the hollow portion constitutes a cavity of the upper rail and the lower rail, and the guide above the notch forms a cap for covering the cavity;

wherein the pull-up rope partially penetrates through the cavity of the upper rail, and the pull-down rope partially penetrates through the cavity of the lower rail, and a bottom of a respective crossbeam is provided with an upper connecting plate that is inserted into the notch of the upper rail and a lower connecting plate that is inserted into the notch of the lower rail respectively, and the upper and lower connecting plates on a respective crossbeam are fixedly connected with the pull-up and pull-down ropes located in the cavity of the upper rail and the lower rail.

Item 18. The sweeping device for the photovoltaic panel according to Item 17, wherein the upper and lower connecting plates each comprise a vertical connecting portion fixedly connected with the crossbeam;

the upper connecting plate and the lower connecting plate each comprise a hook portion inserted into a guide cavity from a guide notch and fixedly connected with the pull rope in the guide cavity corresponding thereto;

wherein the hook portions of the upper and lower connecting plates are respectively suspended in the cavity of the upper rail and the lower rail.

Item 19. A sweeping device for the photovoltaic panel applied to a photovoltaic unit composed by N photovoltaic panel arrays arranged in sequence, wherein the sweeping device comprises a guide rail mechanism composed by an upper rail and a lower rail respectively disposed on an upper side and a lower side of a respective photovoltaic panel array, and M scraper mechanisms for sweeping the photovoltaic unit;

wherein M is a natural number greater than one, and N is an even multiple of M, and each scraper mechanism corresponds one-by-one to the photovoltaic panel array whose number is consistent with that of the scraper mechanism as an even multiple account;

the sweeping device further comprises a pull rope mechanism for driving a respective scraper mechanism to reciprocate on the photovoltaic unit, and a driving mechanism connected with the pull rope mechanism.

Item 20. A sweeping device for the photovoltaic panel applied to a photovoltaic unit composed by N photovoltaic panel arrays arranged in sequence, N being a natural number, wherein the sweeping device comprises a guide rail mechanism composed by an upper rail and a lower rail respectively disposed on an upper side and a lower side of a respective photovoltaic panel array, and a scraper mechanism respectively disposed on a respective guide rail mechanism;

the sweeping device further comprises a pull rope mechanism for pulling a respective scraper mechanism to move in a longitudinal direction of the guide rail mechanism; wherein the pull rope component comprises a pull-up rope connected to a top portion of a respective scraper mechanism and a pull-down rope connected to a tail portion of a respective scraper mechanism, the pull-up rope partially penetrates through the upper rail of a respective guide rail mechanism, and the pull-down rope partially penetrates through the lower rail of a respective guide rail mechanism;

wherein at least a portion of the upper rail is a first detachable section for disconnecting the upper rail, and at least a portion of the lower rail is a second detachable section for disconnecting the lower rail;

wherein lengths of the first detachable section and the second detachable section are the same and are greater than a width of the scraper mechanism, and positions of the first detachable section and the second detachable section correspond to each other.

Item 21. The sweeping device for the photovoltaic panel according to Item 20, wherein the first detachable section is disposed at any position of the upper rail, and the second detachable section is disposed at any position of the lower rail.

Item 22. The sweeping device for the photovoltaic panel according to Item 20 or 21, wherein a length of the first detachable section is less than a length of each of the two parts where the upper rail is disconnected, and a length of the second detachable section is less than a length of each of the two sections where the lower rail is disconnected.

Item 23. The sweeping device for the photovoltaic panel according to Item 20, 21 or 22, wherein the first detachable section is further locked and fixed with two parts where the upper rail is disconnected through an upper locking assembly;

the second detachable section is further locked and fixed with two parts where the lower rail is disconnected through a lower locking assembly.

Item 24. The sweeping device for the photovoltaic panel according to Item 23, wherein the upper locking assembly comprises a first upper fixing bracket and a second upper fixing bracket slidably disposed on two parts where the upper rail is disconnected respectively, a first upper locking member disposed on the first upper fixing bracket, and a second upper locking member disposed on the second upper fixing bracket;

wherein the first upper locking member is locked and fixed when the first upper fixing bracket slides to a joint site of a disconnected part on the upper rail corresponding thereto and the first detachable section; the second upper locking member is locked and fixed when the second upper fixing bracket slides to a joint site of a disconnected the portion on the upper rail corresponding thereto and the first detachable section.

Item 25. The sweeping device for the photovoltaic panel according to Item 24, wherein an upper rail groove is set on the first upper fixing bracket and the second upper fixing bracket respectively, the first detachable section and the two parts where the upper rail is disconnected respectively have an upper insertion portion for being inserted into the upper rail groove;

wherein groove walls at two sides of the upper rail groove gradually gather from the bottom to the top toward the center of the upper rail groove, a cross-sectional shape of the upper insertion portion and a cross-sectional shape of the upper rail groove are the same, and after the upper insertion portion is inserted into the upper rail groove, the upper insertion portion is locked and fixed by means of that the upper insertion portion is undercut by the groove walls on the upper rail groove sides.

Item 26. The sweeping device for the photovoltaic panel according to Item 24 or 25, wherein the first upper locking member and the second upper locking member are screw bolts.

Item 27. The sweeping device for the photovoltaic panel according to any of Items 23 to 26, wherein the lower locking assembly comprises a first lower fixing bracket and a second lower fixing bracket slidably disposed on two parts where the lower rail is disconnected respectively, a first lower locking member disposed on the first lower fixing bracket, and a second lower locking member disposed on the second lower fixing bracket;

wherein the first lower locking member is locked and fixed when the first lower fixing bracket slides to a joint site of a disconnected part on the lower rail corresponding thereto and the second detachable section; the second lower locking member is locked and fixed when the second lower fixing bracket slides to a joint site of a disconnected part on the lower rail corresponding thereto and the second detachable section.

Item 28. The sweeping device for the photovoltaic panel according to Item 27, wherein a lower rail groove is set on the first lower fixing bracket and the second lower fixing bracket respectively, the second detachable section and the two parts where the lower rail is disconnected respectively have a lower insertion portion for being inserted into the lower rail groove;

wherein groove walls at two sides of the lower rail groove gradually gather from the bottom to the top toward the center of the lower rail groove, a cross-sectional shape of the lower insertion portion and a cross-sectional shape of the lower rail groove are the same, and after the lower insertion portion is inserted into the lower rail groove, the lower insertion portion is locked and fixed by means of that the lower insertion portion is undercut by the groove walls on the lower rail groove sides.

Item 29. The sweeping device for the photovoltaic panel according to Item 27 or 28, wherein the first lower locking member and the second lower locking member are screw bolts.

Item 30. A sweeping device for the photovoltaic panel applied to a photovoltaic unit composed by N photovoltaic panel arrays arranged in sequence, wherein the sweeping device comprises a guide rail mechanism composed by an upper rail and a lower rail respectively disposed on an upper side and a lower side of a respective photovoltaic panel array, and a scraper mechanism respectively disposed on a respective guide rail mechanism, N being a natural number greater than one;

the sweeping device further comprises a pull rope mechanism for pulling a respective scraper mechanism to move in a longitudinal direction of the guide rail mechanism and a driving mechanism connected with the pull rope mechanism;

the pull rope component comprises a pull-up rope connected to a top portion of a respective scraper mechanism and a pull-down rope connected to a tail portion of a respective scraper mechanism, the pull-up rope partially penetrates through the upper rail of a respective guide rail mechanism, and the pull-down rope partially penetrates through the lower rail of a respective guide rail mechanism; wherein opposite ends of the upper rails of every two adjacent guide rail mechanisms are respectively provided with an upper rail sleeve for guiding the pull-up rope, and opposite ends of the lower rails of every two adjacent guide rail mechanisms are respectively provided with a lower rail sleeve for guiding the pull-down rope;

wherein the upper and lower rail sleeves have the same structure, and each have a rolling component that resists their corresponding pull rope in interior respectively.

Item 31. The sweeping device for the photovoltaic panel according to Item 30, wherein the rolling component comprises a first roller, a second roller symmetrically arranged with respect to the first roller, as well as a first rotor shaft for fixing the first roller, a second rotor shaft for fixing the second roller;

wherein an inner concave portion where the pull-up rope or the pull-down rope can be embedded is formed on a circumferential surface of the first roller and the second roller, and a position where the inner concave portion of the first roller and the second roller fit constitutes a pull rope accommodation area that can be penetrated by the pull-up rope or the pull-down rope.

Item 32. The sweeping device for the photovoltaic panel according to Item 31, wherein a width of the inner concave portion of the first roller and the inner concave portion of the second roller is greater than a sectional diameter of the pull-up and pull-down ropes, and a depth of the inner concave portion of the first roller and the inner concave portion of the second roller is greater than a sectional radius of the pull-up and pull-down ropes.

Item 33. The sweeping device for the photovoltaic panel according to Item 32, wherein the first roller and the second roller are butted against each other or are separated from each other;

when the first roller and the second roller are separated from each other, the first roller and the second roller are spaced apart from each other by a distance smaller than the cross-sectional diameter of the pull-up and pull-down ropes;

and when the first roller and the second roller are butted against each other, the pull rope accommodation area is a closed annular area.

Item 34. The sweeping device for the photovoltaic panel according to Item 31, 32 or 33, wherein the rolling component further comprises first and second baffle plates symmetrically disposed on two sides of the first roller and the second roller, and the first baffle plate and the second baffle plate completely block at least the site where the first roller and the second roller fit.

Item 35. The sweeping device for the photovoltaic panel according to any of Items 31 to 34, wherein the upper rail sleeve is detachably connected with the upper rail, and the lower rail sleeve is detachably connected with the lower rail.

Item 36. The sweeping device for the photovoltaic panel according to Item 35, wherein the upper rail sleeve has an inner cavity for being inserted by the upper rail, and a shape of the inner cavity of the upper rail sleeve is the same as an outer shape of the upper rail, and after the upper rail is inserted into the inner cavity of the upper rail sleeve, the upper rail sleeve is fixed together with the upper rail by screw bolts:

the lower rail sleeve has an inner cavity for being inserted by the lower rail, and a shape of the inner cavity of the lower rail sleeve is the same as an outer shape of the lower rail, and after the lower rail is inserted into the inner cavity of the lower rail sleeve, the lower rail sleeve is fixed together with the lower rail by screw bolts.

Item 37. The sweeping device for the photovoltaic panel according to any of Items 30 to 36, wherein the upper rail and the lower rail have the same shape, and sectional shapes of the upper rail and the lower rail are a hollow structure with a notch, the hollow portion constitutes a cavity of the upper rail and the lower rail, and the guide above the notch forms a cap for covering the cavity;

wherein the pull-up rope partially penetrates through the cavity of the upper rail, and the pull-down rope partially penetrates through the cavity of the lower rail, and a bottom of a respective scraper mechanism is respectively provided with an upper connecting plate that is inserted into the notch of the upper rail and a lower connecting plate that is inserted into the notch of the lower rail, and the upper and lower connecting plates on a respective scraper mechanism are fixedly connected with the pull-up and pull-down ropes located in the cavity of the upper rail and the lower rail.

Item 39. The sweeping device for the photovoltaic panel according to Item 37, wherein the upper and lower connecting plates each comprise a vertical connecting portion fixedly connected with the scraper mechanism;

the upper connecting plate and the lower connecting plate each comprise a hook portion inserted into a guide cavity from a guide notch and fixedly connected with the pull rope in the guide cavity corresponding thereto;

wherein the hook portions of the upper and lower connecting plates are respectively suspended in the cavity of the upper rail and the lower rail.

A person of ordinary skill in the art can understand that the above description is specific examples of a part of the embodiments of the present invention, and various changes in form and detail can be made without departing from the spirit and range of the present invention in practical applications.

What is claimed is:

1. A sweeping device for a photovoltaic panel applied to a photovoltaic unit composed by N photovoltaic panel arrays arranged in sequence, N being a natural number, wherein the sweeping device comprises: a guide rail mechanism composed by an upper rail and a lower rail respectively disposed on an upper side and a lower side of a respective photovoltaic panel array, and a scraper mechanism respectively disposed on a respective guide rail mechanism;

the sweeping device further comprises a pull rope mechanism for pulling a respective scraper mechanism to move in a longitudinal direction of the guide rail mechanism; wherein the pull rope mechanism comprises a pull-up rope connected to the top of a respective scraper mechanism and a pull-down rope connected to a tail of a respective scraper mechanism, the pull-up rope partially penetrates through the upper rail of a respective guide rail mechanism, and the pull-down rope partially penetrates through the lower rail of a respective guide rail mechanism;

wherein at least a portion of the upper rail is a first detachable section for disconnecting the upper rail, and at least a portion of the lower rail is a second detachable section for disconnecting the lower rail;

wherein lengths of the first detachable section and the second detachable section are the same and are greater than a width of the scraper mechanism, and positions of the first detachable section and the second detachable section correspond to each other.

2. The sweeping device for the photovoltaic panel according to claim 1, wherein the first detachable section is further locked and fixed with two parts where the upper rail is disconnected through an upper locking assembly;

the second detachable section is further locked and fixed with two parts where the lower rail is disconnected through a lower locking assembly.

3. The sweeping device for the photovoltaic panel according to claim 2, wherein the upper locking assembly comprises a first upper fixing bracket and a second upper fixing bracket slidably disposed on the two parts where the upper rail is disconnected respectively, a first upper locking member disposed on the first upper fixing bracket, and a second upper locking member disposed on the second upper fixing bracket;

wherein the first upper locking member is locked and fixed when the first upper fixing bracket slides to the joint part of the first disconnected part on the upper rail corresponding thereto and the first detachable section; the second upper locking member is locked and fixed when the second upper fixing bracket slides to the joint part of the first disconnected part on the upper rail corresponding thereto and the first detachable section.

4. The sweeping device for the photovoltaic panel according to claim 3, wherein an upper rail groove is set on the first upper fixing bracket and the second upper fixing bracket respectively, the first detachable section and the two parts where the upper rail is disconnected respectively have an upper insertion portion for being inserted into the upper rail groove;

wherein groove walls at two sides of the upper rail groove gradually gather from the bottom to the top toward the center of the upper rail groove, a cross-sectional shape of the upper insertion portion and a cross-sectional shape of the upper rail groove are the same, and after the upper insertion portion is inserted into the upper rail groove, the upper insertion portion is locked and fixed by means of that the upper insertion portion is undercut by the groove walls on the upper rail groove sides.

5. The sweeping device for the photovoltaic panel according to claim 3, wherein the first upper locking member and the second upper locking member are screw bolts.

6. The sweeping device for the photovoltaic panel according to claim 3, wherein the lower locking assembly comprises a first lower fixing bracket and a second lower fixing bracket slidably disposed on two parts where the lower rail is disconnected respectively, a first lower locking member disposed on the first lower fixing bracket, and a second lower locking member disposed on the second lower fixing bracket;

wherein the first lower locking member is locked and fixed when the first lower fixing bracket slides to a joint site of a disconnected part on the lower rail corresponding thereto and the second detachable section; the second lower locking member is locked and fixed when the second lower fixing bracket slides to a joint site of a disconnected part on the lower rail corresponding thereto and the second detachable section.

7. The sweeping device for the photovoltaic panel according to claim 6, wherein a lower rail groove is set on the first lower fixing bracket and the second lower fixing bracket respectively, the second detachable section and the two parts where the lower rail is disconnected respectively have a lower insertion portion for being inserted into the lower rail groove;

wherein groove walls at two sides of the lower rail groove gradually gather from the bottom to the top toward the center of the lower rail groove, a cross-sectional shape of the lower insertion portion and a cross-sectional shape of the lower rail groove are the same, and after the lower insertion portion is inserted into the lower rail groove, the lower insertion portion is locked and fixed by means of that the lower insertion portion is undercut by the groove walls on the lower rail groove sides.

8. The sweeping device for the photovoltaic panel according to claim 6, wherein the first lower locking member and the second lower locking member are screw bolts.

9. The sweeping device for the photovoltaic panel according to claim 1, wherein the first detachable section is disposed at any position of the upper rail, and the second detachable section is disposed at any position of the lower rail.

10. The sweeping device for the photovoltaic panel according to claim 1, wherein a length of the first detachable section is less than a length of each of the two parts where the upper rail is disconnected, and a length of the second detachable section is less than a length of each of the two sections where the lower rail is disconnected.

11. A sweeping device for a photovoltaic panel applied to a photovoltaic unit composed by N photovoltaic panel arrays arranged in sequence, wherein the sweeping device comprises a guide rail mechanism composed by an upper rail and a lower rail respectively disposed on an upper side and a lower side of a respective photovoltaic panel array, and a scraper mechanism respectively disposed on a respective guide rail mechanism, N being a natural number greater than one;

the sweeping device further comprises a pull rope mechanism for pulling a respective scraper mechanism to move in a longitudinal direction of the guide rail mechanism and a driving mechanism connected with the pull rope mechanism; wherein the pull rope mechanism comprises a pull-up rope connected to the top of a respective scraper mechanism and a pull-down rope connected to a tail of a respective scraper mechanism, the pull-up rope partially penetrates through the upper rail of a respective guide rail mechanism, and the pull-down rope partially penetrates through the lower rail of a respective guide rail mechanism;

wherein opposite ends of the upper rails of every two adjacent guide rail mechanisms are respectively provided with an upper rail sleeve for guiding the pull-up rope, and opposite ends of the lower rails of every two adjacent guide rail mechanisms are respectively provided with a lower rail sleeve for guiding the pull-down rope;

wherein the upper and lower rail sleeves have the same structure, and each have a rolling component that resists their corresponding pull-down rope in interior respectively.

12. The sweeping device for the photovoltaic panel according to claim 11, wherein the rolling component comprises a first roller, a second roller symmetrically arranged with respect to the first roller, a first rotor shaft for fixing the first roller, a second rotor shaft for fixing the second roller;

wherein an inner concave portion where the pull-up rope or the pull-down rope can be embedded is formed on a circumferential surface of the first roller and the second roller, and a portion where the inner concave portions of the first roller and the second roller cooperate with each other constitute a pull rope accommodation area that can be penetrated by the pull-up rope or the pull-down rope.

13. The sweeping device for the photovoltaic panel according to claim 12, wherein the width of the inner concave portion of the first roller and the inner concave portion of the second roller is greater than the cross-sectional diameter of the pull-up rope and the pull-down rope, and the depth of the inner concave portion of the first roller and the inner concave portion of the second roller is greater than the cross-sectional radius of the pull-up rope and the pull-down rope.

14. The sweeping device for the photovoltaic panel according to claim 13, wherein the first roller and the second roller are butted against each other or are separated from each other;

when the first roller and the second roller are separated from each other, the first roller and the second roller are spaced apart from each other by a distance smaller than the cross-sectional diameter of the pull-up and pull-down ropes;

and when the first roller and the second roller are butted against each other, the pull rope accommodation area is a closed annular area.

15. The sweeping device for the photovoltaic panel according to claim 12, wherein the rolling component further comprises first and second baffle plates symmetrically disposed on two sides of the first roller and the second roller, and the first baffle plate and the second baffle plate completely block at least the site where the first roller and the second roller fit.

16. The sweeping device for the photovoltaic panel according to claim 12, wherein the upper rail sleeve is detachably connected with the upper rail, and the lower rail sleeve is detachably connected with the lower rail.

17. The sweeping device for the photovoltaic panel according to claim 16, wherein the upper rail sleeve has an inner cavity for being inserted by the upper rail, and a shape of the inner cavity of the upper rail sleeve is the same as an outer shape of the upper rail, and after the upper rail is inserted into the inner cavity of the upper rail sleeve, the upper rail sleeve is fixed together with the upper rail by screw bolts;

the lower rail sleeve has an inner cavity for being inserted by the lower rail, and a shape of the inner cavity of the lower rail sleeve is the same as an outer shape of the lower rail, and after the lower rail is inserted into the inner cavity of the lower rail sleeve, the lower rail sleeve is fixed together with the lower rail by screw bolts.

18. The sweeping device for the photovoltaic panel according to claim 11, wherein the upper rail and the lower rail have the same shape, and cross-sectional shapes of the upper rail and the lower rail are a hollow structure with a notch, the hollow structure constitutes a cavity of the upper rail and the lower rail, and the guide portion above the notch forms a cap for covering the cavity;

wherein the pull-up rope partially penetrates through the cavity of the upper rail, and the pull-down rope partially penetrates through the cavity of the lower rail, and a bottom of a respective scraper mechanism is respectively provided with an upper connecting plate that is inserted into the notch of the upper rail and a lower connecting plate that is inserted into the notch of the lower rail, and the upper and lower connecting plates on a respective scraper mechanism are fixedly connected with the pull-up and pull-down ropes located in the cavity of the upper rail and the lower rail.

19. The sweeping device for the photovoltaic panel according to claim 11, wherein the upper and lower connecting plates each comprise a vertical connecting portion fixedly connected with the scraper mechanism;

the upper connecting plate and the lower connecting plate each comprise a hook portion inserted into a guide cavity from a guide notch and fixedly connected with the pull rope in the guide cavity corresponding thereto;

wherein the hook portions of the upper and lower connecting plates are respectively suspended in the cavity of the upper rail and the lower rail.

* * * * *